(12) United States Patent
Taghipour

(10) Patent No.: US 12,473,937 B2
(45) Date of Patent: Nov. 18, 2025

(54) FLUID FLOW CONDUIT WITH CONTROLLED HYDRODYNAMICS

(71) Applicant: The University of British Columbia, Vancouver (CA)

(72) Inventor: Fariborz Taghipour, Burnaby (CA)

(73) Assignee: The University of British Columbia, Vancouver (CA)

( * ) Notice: Subject to any disclaimer, the term of this patent is extended or adjusted under 35 U.S.C. 154(b) by 712 days.

(21) Appl. No.: 17/727,612

(22) Filed: Apr. 22, 2022

(65) Prior Publication Data

US 2022/0268301 A1    Aug. 25, 2022

Related U.S. Application Data

(63) Continuation of application No. PCT/CA2020/051451, filed on Oct. 28, 2020.
(Continued)

(51) Int. Cl.
*F15D 1/00* (2006.01)
*B01J 19/24* (2006.01)
*C02F 1/32* (2023.01)

(52) U.S. Cl.
CPC ............ *F15D 1/0015* (2013.01); *B01J 19/24* (2013.01); *C02F 1/325* (2013.01); *C02F 2201/328* (2013.01); *C02F 2303/04* (2013.01)

(58) Field of Classification Search
CPC .................................. F15D 1/005; F15D 1/02
(Continued)

(56) References Cited

U.S. PATENT DOCUMENTS 3,582,045 A * 6/1971 Leybourne, III ... B01F 25/4314
138/42
3,949,970 A * 4/1976 ter Braak ................ F28F 13/12
239/432
(Continued)

FOREIGN PATENT DOCUMENTS

CA    3069755 A1    1/2019
CA    2980178 A1    3/2019
(Continued)

*Primary Examiner* — David R Deal
(74) *Attorney, Agent, or Firm* — Todd A. Rattray; Oyen Wiggs Green & Mutala LLP

(57) ABSTRACT

A fluid flow conduit comprises a flow-shaping element shaped to control the velocity distribution of fluid flowing therethrough. A conduit body is shaped to define a longitudinally oriented interior flow region. The flow-shaping element comprises a flow-shaping channel shaped to provide a first curved channel portion curved about a longitudinal axis in a first angular direction to impart angular momentum about the longitudinal axis in the first angular direction on fluid flow therethrough. The flow-shaping channel may be shaped to provide a second curved channel portion that is curved about the longitudinal axis in a second angular direction (opposed to the first angular direction) to impart angular momentum about the longitudinal axis in the second angular direction on fluid flow therethrough. The flow-shaping channel may be shaped to provide one or more slits that communicate fluid between the first and second curved channel portions and a central bore portion.

18 Claims, 14 Drawing Sheets

Related U.S. Application Data

(60) Provisional application No. 62/927,096, filed on Oct. 28, 2019.

(58) Field of Classification Search
USPC ............ 138/37, 39; 366/336, 338–340
See application file for complete search history.

(56) References Cited

U.S. PATENT DOCUMENTS

| | | | | |
|---|---|---|---|---|
| 4,053,141 | A * | 10/1977 | Gussefeld | B01F 25/434 366/339 |
| 4,337,032 | A * | 6/1982 | Duplouy | B01J 8/18 432/106 |
| 5,171,557 | A * | 12/1992 | Crosbie | B01J 19/0053 366/339 |
| 5,675,153 | A | 10/1997 | Snowball | |
| 6,797,181 | B2 * | 9/2004 | Morse | B01F 25/10 210/205 |
| RE40,407 | E * | 7/2008 | Natarius | B01F 23/2323 55/459.1 |
| 7,622,036 | B2 * | 11/2009 | Morse | B01F 25/10 366/132 |
| 8,791,176 | B2 | 7/2014 | Van De Runstraat et al. | |
| 2006/0005892 | A1 * | 1/2006 | Kuo | F15D 1/02 366/338 |
| 2010/0181517 | A1 * | 7/2010 | Paz Briz | F16K 11/07 251/324 |
| 2011/0318237 | A1 | 12/2011 | Woodling et al. | |
| 2016/0332127 | A1 | 11/2016 | Smith | |
| 2018/0085719 | A1 | 3/2018 | Larner et al. | |
| 2018/0257953 | A1 | 9/2018 | Mochizuki et al. | |
| 2021/0032136 | A1 * | 2/2021 | Cates | B01J 27/186 |

FOREIGN PATENT DOCUMENTS

| | | |
|---|---|---|
| DE | 4305227 C1 | 8/1994 |
| EP | 1839738 A1 | 10/2007 |
| WO | 2018213936 A1 | 11/2018 |

* cited by examiner

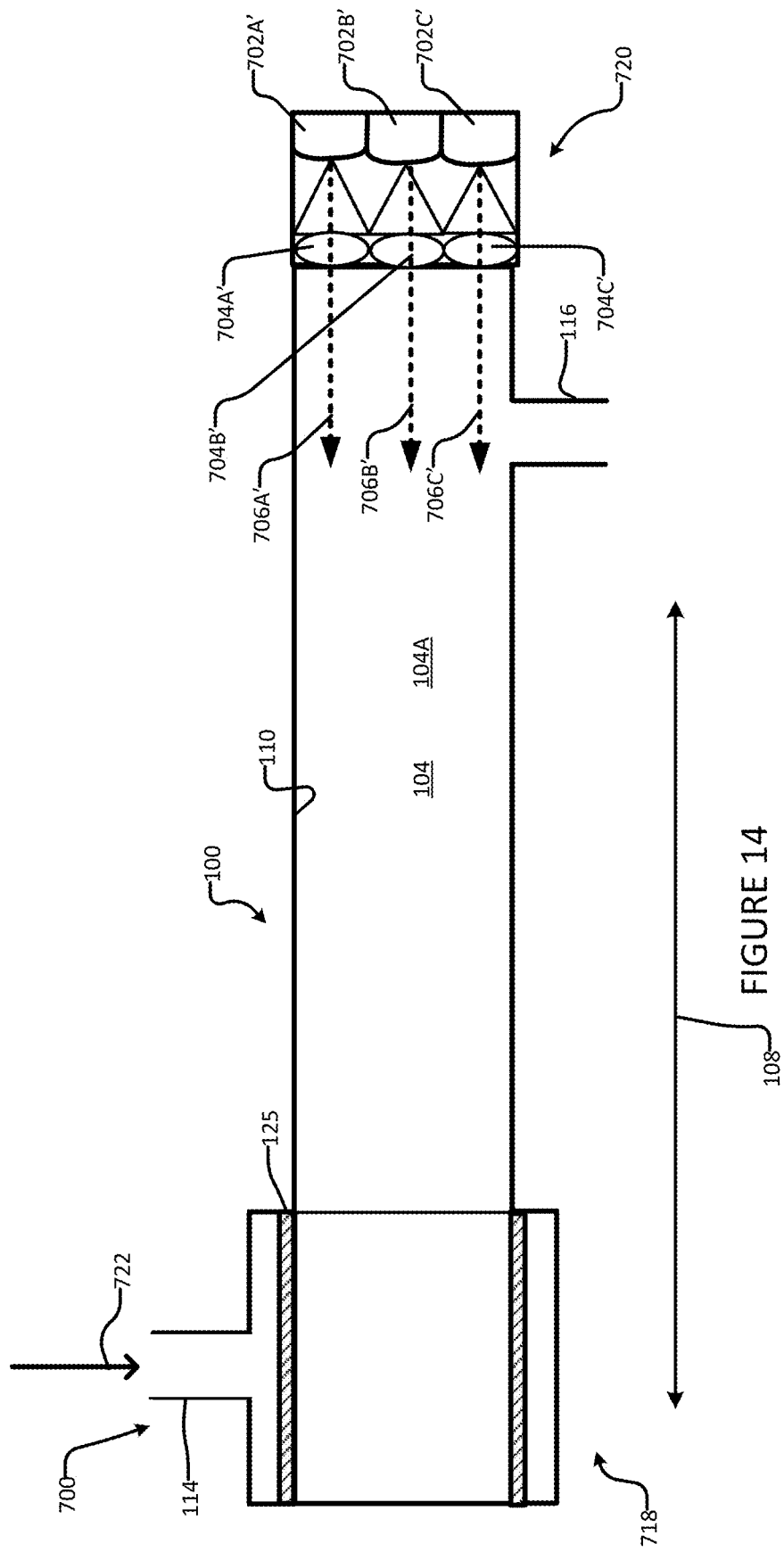

FLUID FLOW CONDUIT WITH CONTROLLED HYDRODYNAMICS

CROSS-REFERENCE TO RELATES APPLICATIONS

This application is a continuation of Patent Cooperation Treaty (PCT) application No. PCT/CA2020/051451 having an international filing date of 28 Oct. 2020, which in turn claims priority to, and for the purposes of the United States the benefit under 35 USC 119(e) in connection with, U.S. application No. 62/927096 filed 28 Oct. 2019. All of the applications referred to in this paragraph are hereby incorporated herein by reference.

TECHNICAL FIELD

The present disclosure relates to fluid flow conduits with controlled hydrodynamics. Some embodiments of the present disclosure relate to methods and apparatus for controlling hydrodynamics in fluid flow conduits. Particular embodiments may have application to fluid flow conduits used to provide various types of reactors including chemical reactors, bio-reactors, photo-reactors and/or the like.

BACKGROUND

It may be desirable to have some control over the fluid velocity distribution in a fluid flow conduit. An example, where such control over the fluid velocity distribution in a conduit is desirable is in "flow-through" ultraviolet (UV) photoreactors, such as by way of non-limiting example, those disclosed in U.S. Pat. No. 9,938,165, where UV radiation is used to treat (e.g. disinfect) water and/or other fluids, as the fluids flow through a reaction chamber of the reactor. Since the fluid passes through the reaction chamber in such reactors, the reaction chamber may be considered to be a type of fluid flow conduit. One factor affecting the efficacy of such UV reactors is fluid velocity distribution within the reaction chamber of the reactor. Variation in the fluid velocity distribution may cause an uneven residence time distribution within the reaction chamber and may in turn result in a wide range of UV dose distribution to fluid as it passes through the reaction chamber. Fluids that travel at relatively low speeds may have sufficient resident time and be exposed to sufficient UV radiation dose for effective treatment. However, fluids that travel at relatively high speeds may not have sufficient resident time and, consequently, may be exposed to insufficient UV radiation dose for effective treatment.

A second factor affecting the efficacy of a UV reactor is fluence rate (often measured in $W/m^2$), which represents the radiant flux (power) passing from all directions through an infinitesimally small sphere of cross-sectional area dA, divided by dA. Light emitting diodes (LEDs), which are used in modern UV reactors, typically emit radiation of relatively narrow bandwidth and, for the purposes of use in UV photoreactors, the radiation emitted by LEDs may be considered to be monochromatic (i.e. of a single wavelength). In a typical UV-LED reactor, there can be considerable variation of the spatial radiant power distribution within the reaction chamber of the reactor, resulting in an uneven fluence rate distribution.

Either variation in the fluence rate distribution, variation in the velocity distribution, or variation in both of these factors, may result in a considerably wide range of UV dose distribution delivered to fluid as it passes through the reaction chamber of the reactor. There is a general desire to provide desirably uniform UV dose distribution to fluids passing through flow-through photoreactors, such as flow-through UV photoreactors. Such uniformity of dose distribution can be used to ensure that the fluid receives sufficient dose to effectively treat the fluid as it flows through the reactor.

It is known to deploy flow-restraining elements in the reaction chamber of flow through photoreactors to restrain portions of the fluid flow, thereby providing a potentially more uniform velocity distribution and corresponding uniformity of fluid residence time in the reaction chamber. Further, it is known to use static mixers and vertex generators in the reaction chamber to generate mixing of the fluid flow, which may also provide a potentially more uniform velocity distribution and corresponding uniformity of fluid residence time in the reaction chamber. However, positioning such flow-restraining elements and/or mixers in the reactor chamber in many cases may be undesirable. For example, positioning such elements in the reaction chamber may occlude radiation from reaching certain regions of the reaction chamber (i.e. the elements block radiation). Thus, while such restraining/mixing elements may provide desirable fluid flow uniformity, they can adversely impact the uniformity of the fluence rate distribution and, ultimately, may not address the desirability of imparting uniform dose to the fluid as it passes through the reactor.

There is a general desire for fluid flow conduits (e.g. the reaction chambers of flow-through reactors) with controlled hydrodynamics resulting in desirably uniform residence time within the fluid flow conduits. There is a general desire for fluid flow-through reactors (e.g. UV photoreactors, other types of photoreactors, chemical reactors, bioreactors and/or the like) with controlled hydrodynamics, resulting in desirably uniform residence time within the reaction chambers of such flow-through reactors. In the case of photoreactors (e.g. UV photoreactors and/or the like), there is also a general desire for controlling the hydrodynamics within the reactor in a manner that permits a desirably uniform radiant fluence rate distribution to the fluid flowing through the reactor and a correspondingly uniform dose to the fluid as it passes through the reactor.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of this disclosure provides a fluid flow conduit comprising: a conduit body shaped to define a longitudinally oriented interior flow region; an inlet for introducing fluid into the interior flow region; an outlet for conveying fluid out of the interior flow region; and a flow-shaping element located in a fluid flow path between the inlet and the outlet, the flow-shaping element comprising a flow-shaping channel shaped to provide a first curved channel portion that is curved about a longitudinal axis in a first angular direction.

The inlet may be oriented in an inlet flow direction that is non-parallel to the longitudinal axis. The outlet may be oriented in an outlet flow direction that is non-parallel to the longitudinal axis.

The first curved channel portion may be shaped to impart angular momentum about the longitudinal axis in the first angular direction on fluid flow through the first curved channel portion.

The flow-shaping channel may be shaped to provide a second curved channel portion that is curved about the longitudinal axis in a second angular direction, the second angular direction opposed to the first angular direction.

The second curved channel may be shaped to impart angular momentum about the longitudinal axis in the second angular direction on fluid flow through the second curved channel portion.

The flow-shaping channel may be shaped to provide a slit that communicates fluid between the first and second curved channel portions and a bore portion. The flow-shaping element may be located between the inlet and the interior flow region and the slit may be located transversely opposite to the inlet. The flow-shaping element may be located between the interior flow region and the outlet and the slit may be located transversely opposite to the outlet.

The flow-shaping channel may be shaped to provide one or more second slits that communicate fluid between at least one of the first and second curved channel portions and the bore portion.

The bore portion may be located relatively more proximate, in a transverse direction, than the first and second curved channel portions to the longitudinal axis about which the first and second curved channel portions are curved.

The flow-shaping element may be located in the fluid flow path between: the inlet and the interior flow region for directing fluid from the inlet, through the flow-shaping channel and into the interior flow region.

The flow-shaping channel may be shaped so that the fluid flows from the first and second curved channel portions into the bore portion.

The bore portion may have a transverse cross-sectional area larger than respective cross-sectional areas of the first and second curved channel portions. A ratio of the transverse cross-sectional area of the bore portion to the respective cross-sectional areas of the first and second curved channel portions may be greater than 2.5.

The flow-shaping channel may be shaped such that an average flow direction of the fluid is in the longitudinal direction when the fluid enters the interior flow region.

The fluid flowing through the interior flow region may have an average flow rate that is slower than an average flow rate of the fluid flowing through the first and second curved channel portions.

The flow-shaping channel may be shaped such that the fluid entering the interior flow region has local angular momentum that causes the fluid entering the interior flow region to exhibit counter-rotating vortices.

The inlet may be shaped and/or oriented such that an average flow direction of the fluid is non-parallel to the longitudinal direction when the fluid enters the flow-shaping channel.

The flow-shaping element may be located in the fluid flow path between: an interior flow region from which fluid flows into the flow-shaping channel in the longitudinal direction; and the outlet.

The flow-shaping channel may be shaped so that the fluid flows from the bore portion into the first and second curved channel portions.

The conduit may form part of a flow-through reactor, wherein the interior flow region of the conduit provides a reaction chamber of the flow-through reactor. The flow-through reactor may be a photoreactor. The flow-through reactor may be a UV photoreactor. The flow-shaping element may be shaped so as to permit radiation to impinge on fluid in the reaction chamber without occlusion from the flow-shaping element. The UV photoreactor comprises one or more UV emitters oriented or optically oriented by one or more suitable optical elements (e.g. lenses, reflective surfaces and/or the like) such that their principal optical axes extend through the bore portion.

Another aspect of this disclosure provides a flow-through reactor for fluid, the flow-through reactor comprising: a fluid flow conduit comprising a conduit body shaped to define a longitudinally oriented interior flow region which provides a reaction chamber for the flow-through reactor; an inlet for introducing fluid into the interior flow region; an outlet for conveying fluid out of the interior flow region; and a flow-shaping element located in a fluid flow path between the inlet and the outlet, the flow-shaping element comprising a flow-shaping channel shaped to provide a first curved channel portion that is curved about a longitudinal axis in a first angular direction.

The inlet may be oriented in an inlet flow direction that is non-parallel to the longitudinal direction. The outlet may be oriented in an outlet flow direction that is non-parallel to the longitudinal direction.

The first curved channel portion may be shaped to impart angular momentum about the longitudinal axis in the first angular direction on fluid flow through the first curved channel portion.

The flow-shaping channel may be shaped to provide a second curved channel portion that is curved about the longitudinal axis in a second angular direction, the second angular direction opposed to the first angular direction. The second curved channel portion may be shaped to impart angular momentum about the longitudinal axis in the second angular direction on fluid flow through the second curved channel portion.

The flow-through reactor may be a photoreactor. The photoreactor may comprise a UV electromagnetic radiation emitter positioned at one longitudinal end of the flow-through reactor to illuminate the reaction chamber.

Another aspect of this disclosure provides a method for controlling a velocity distribution of fluid flowing through a fluid flow conduit. The method comprises: introducing fluid via an inlet into a longitudinally oriented interior flow region of the fluid flow conduit; flowing the fluid through the interior flow region; flowing the fluid through a flow-shaping element located in a fluid flow path between the inlet and the outlet, the flow-shaping element comprising a flow-shaping channel providing a first curved channel portion that is curved about a longitudinal axis in a first angular direction; and conveying the fluid out of the interior flow region via an outlet.

Flowing the fluid through the flow-shaping element may occur before flowing the fluid through the interior flow region.

The method may comprise flowing the fluid through a second curved channel portion that is curved about the longitudinal axis in a second angular direction, the second angular direction opposed to the first angular direction. The method may comprise flowing the fluid through a slit that communicates fluid between the first and second curved channel portions and a bore portion. The method may comprise flowing the fluid from the first and second curved channel portions into the bore portion. The fluid flowing through the bore portion may exhibit counter-rotating vortices.

Another aspect of the present disclosure provides a fluid flow conduit comprising a flow-shaping element. The flow-shaping element is shaped to control the velocity distribution of fluid flowing through the fluid flow conduit.

In some embodiments, the fluid flow conduit comprises a conduit body shaped to define a longitudinally oriented interior flow region; an inlet for introducing fluid into the interior flow region; and an outlet for conveying fluid out of the interior flow region. The flow-shaping element is located in a fluid flow path between the inlet and the outlet, the flow-shaping element comprising a flow-shaping channel shaped to provide a first curved channel portion that is curved about a longitudinal axis in a first angular direction. The first curved channel portion may impart angular momentum about the longitudinal axis in the first angular direction on fluid flow through the first curved channel portion.

The inlet may be oriented in an inlet flow direction that is non-parallel to the longitudinal axis. The outlet may be oriented in an outlet flow direction that is non-parallel to the longitudinal axis.

In some embodiments, the flow-shaping channel is shaped to provide a second curved channel portion that is curved about the longitudinal axis in a second angular direction, the second angular direction opposed to the first angular direction. The second curved channel may be shaped to impart angular momentum about the longitudinal axis in the second angular direction on fluid flow through the second curved channel portion.

In some embodiments, the flow-shaping channel is shaped to provide one or more slits that communicate fluid between the first and second curved channel portions and a bore portion. The bore portion may be located relatively more proximate, in a transverse direction, than the first and second curved channel portions to the longitudinal axis about which the first and second curved channel portions are curved.

The flow-shaping element may be located in the fluid flow path between: the inlet and the interior flow region for directing fluid from the inlet, through the flow-shaping channel and into the interior flow region. The flow-shaping channel may be shaped so that the fluid flows from the first and second curved channel portions into the bore portion.

In some embodiments, the bore portion has transverse cross-sectional area that is larger than the cross-sectional area of the first and second curved channel portions. A ratio of the transverse cross-sectional area of the bore portion to the cross-sectional area of the first and second curved channel portions may be more than 5.

In some embodiments, the flow-shaping channel is shaped such that an average flow direction of the fluid is in the longitudinal direction when the fluid enters the interior flow region. The flow-shaping channel may be shaped such that the fluid entering the interior flow region has local angular momentum that causes the fluid entering the interior flow region to exhibit counter-rotating vortices. The inlet may be shaped and/or oriented such that an average flow direction of the fluid is non-parallel to the longitudinal direction when the fluid enters the flow-shaping channel.

Another aspect of the present disclosure provides a flow-through reactor for fluid. The flow-through reactor comprises a fluid flow conduit comprising a conduit body shaped to define a longitudinally oriented interior flow region which provides a reaction chamber for the flow-through reactor; an inlet for introducing fluid into the interior flow region; an outlet for conveying fluid out of the interior flow region; and a flow-shaping element located in a fluid flow path between the inlet and the outlet, the flow-shaping element comprising a flow-shaping channel shaped to provide a first curved channel portion that is curved about a longitudinal axis in a first angular direction.

The flow-shaping element (located upstream of the reaction chamber of a UV photoreactor and/or downstream of the reaction chamber of a UV photoreactor) may permit a relatively even dose distribution, as the flow-shaping element causes mixing of the fluid passing through the reactor, so that all parts of the fluid passing through the reaction chamber travel through regions of both high and low radiant flux of an uneven radiant fluence distribution.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 14 shows a schematic cross-sectional view of a fluid flow conduit according to another example embodiment.

DESCRIPTION

Figure 1:
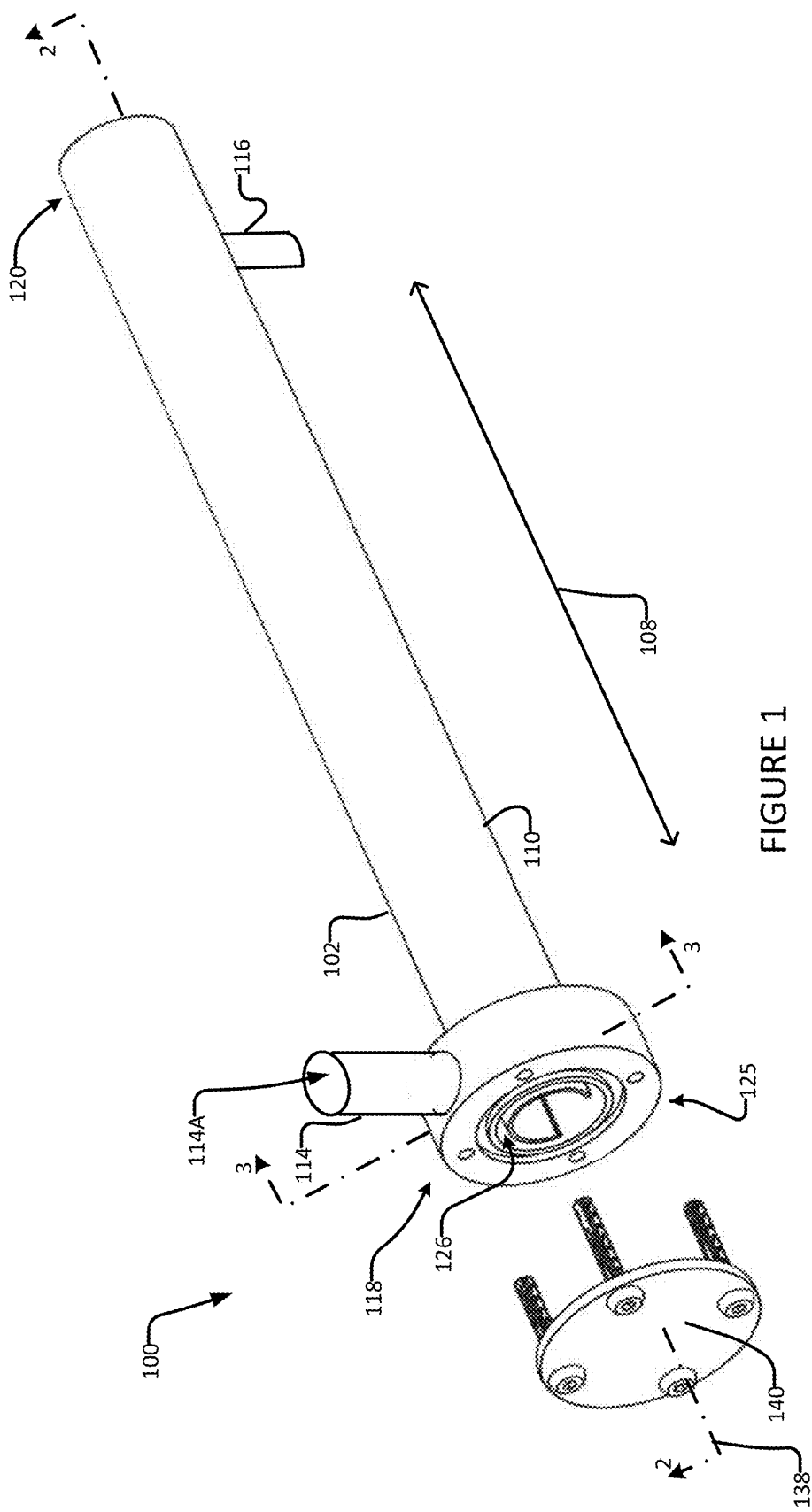
FIG. 1 shows a partially exploded perspective view of a fluid flow conduit incorporating a flow-restraining element according to an example embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, the term "upstream" means a direction opposite from the direction of average fluid flow through a fluid flow conduit. A first location that is upstream of a second location means that the first location is located relatively far in the upstream direction relative to the second location. The term "downstream" means a direction of average fluid flow through a fluid flow conduit. A first location that is downstream of a second location means that the first location is located relatively far in the downstream direction relative to the second location. For example, an inlet to a fluid flow conduit would be at the upstream end and an outlet from the fluid flow conduit would be at the downstream end.

One aspect of the present disclosure provides a fluid flow conduit comprising a flow-shaping element shaped to control the velocity distribution of fluid flowing through the fluid conduit. The fluid flow conduit further comprises a conduit body shaped to define a longitudinally oriented interior flow region. The flow-shaping element comprises a flow-shaping channel shaped to provide a first curved channel portion that is curved about a longitudinal axis in a first angular direction. The first curved channel may be shaped to impart angular momentum about the longitudinal axis in the first angular direction on fluid flow through the first curved channel portion. The flow-shaping channel may be shaped to provide a second curved channel portion that is curved about the longitudinal axis in a second angular direction, the second angular direction opposed to the first angular direction. The second curved channel portion may be shaped to impart angular momentum about the longitudinal axis in the second angular direction on fluid flow through the second curved channel portion. The flow-shaping channel may be shaped to provide one or more slits that communicate fluid between the first and second curved channel portions and a central bore portion, the central bore portion located relatively more proximate, in a transverse direction, to the longitudinal axis about which the first and second curved channel portions are curved. In some embodiments, the flow-shaping channel is shaped such that the fluid entering the interior flow region has local angular momentum that causes the fluid entering the interior flow region to exhibit counter-rotating vortices.

The flow-shaping element may be located between: an inlet shaped and/or located to direct fluid flow into the flow-shaping channel; and an interior flow region oriented in a longitudinal direction to receive fluid flow from the flow-shaping channel. The inlet may be oriented to direct fluid into the flow-shaping channel in any suitable direction. In some non-limiting embodiments, the inlet is oriented to direct fluid into the flow-shaping channel in a direction that is non-parallel to the longitudinal direction. In some non-limiting embodiments, the inlet is oriented to direct fluid into the flow-shaping channel in a transverse direction that is orthogonal to the longitudinal direction. The flow-shaping element may impart arcuate/angular momentum onto the fluid that flows through the flow-shaping element to thereby mix the fluid in the interior flow region. The mixed fluid enters into the interior flow region and then exits from the outlet. The mixing of the fluid may lead to a potentially more uniform velocity distribution and corresponding uniformity of fluid residence time in the interior flow region of the fluid flow conduit.

The flow-shaping element may be located between: an interior flow region oriented in a longitudinal direction from which fluid flows into the flow-shaping channel; and an outlet shaped and/or located to receive fluid flow from the flow-shaping channel. The outlet may be oriented to receive fluid flow from the flow-shaping channel in any suitable direction. In some non-limiting embodiments, the outlet is oriented to receive fluid from the flow-shaping channel in a direction that is non-parallel to the longitudinal direction. In some non-limiting embodiments, the outlet is oriented to receive fluid from the flow-shaping channel in a transverse direction that is orthogonal to the longitudinal direction. The flow-shaping element may impart arcuate/angular momentum onto the fluid that flows through the flow-shaping element to thereby mix the fluid in the interior flow region. The mixing of the fluid may lead to a potentially more uniform velocity distribution and corresponding uniformity of fluid residence time in the interior flow region of fluid flow conduit.

Figure 2:
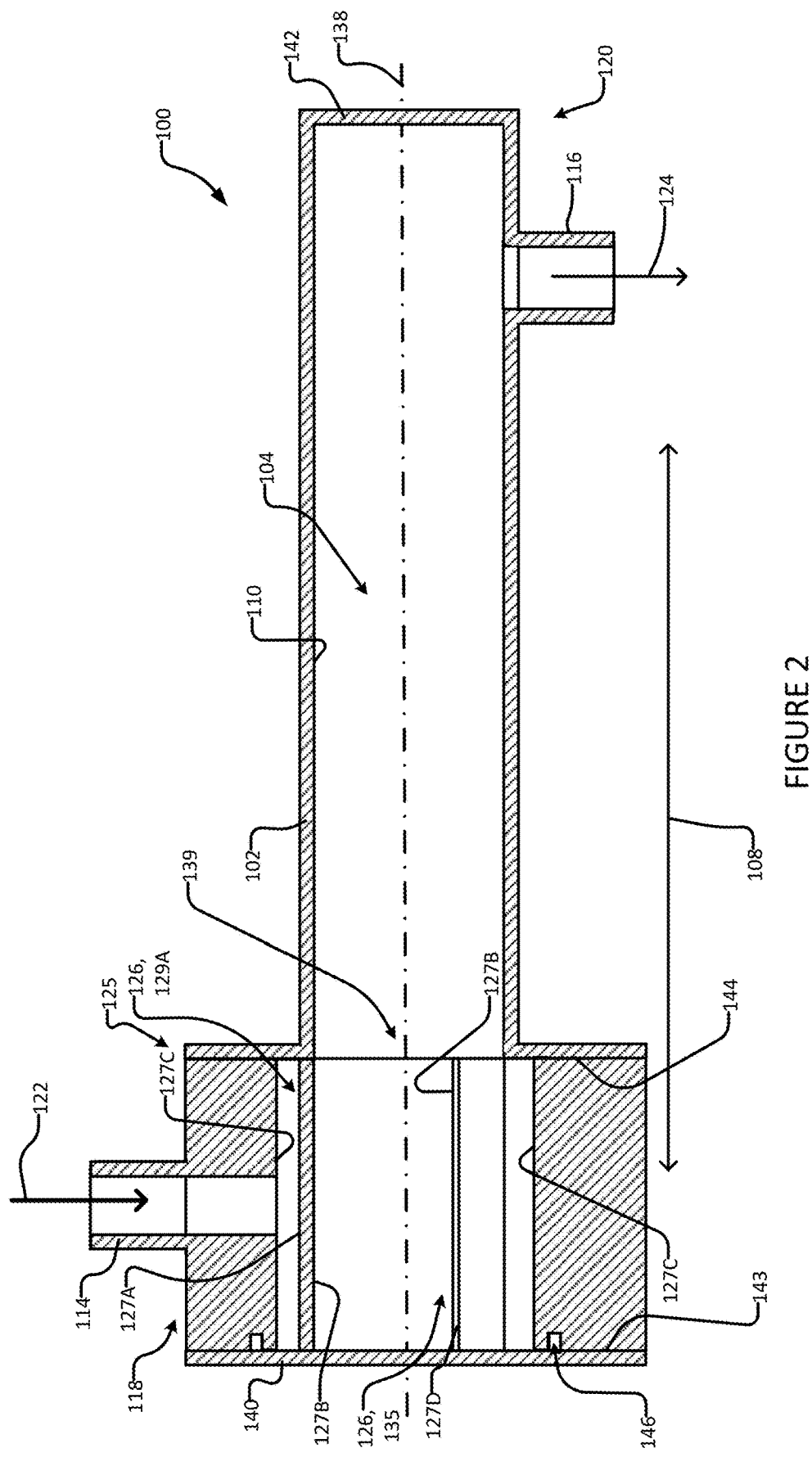
FIG. 2 shows a schematic cross-sectional view of the FIG. 1 fluid flow conduit, taken along line 2-2 shown in FIG. 1.

FIGS. 1-3 depict a fluid flow conduit 100 according to an example embodiment.

Conduit 100 comprises a close-ended conduit body 102 having a bore-defining surface 110 which defines an interior flow region 104 (see FIG. 2). In the illustrated embodiment, bore-defining surface 110 is shaped such that interior flow region 104 is generally cylindrical, although this shape is not necessary. Conduit 100 comprises an inlet 114, at or proximate to, its upstream end 118, for introducing fluid into conduit 100 and an outlet 116, at, or proximate to, its downstream end 120, for conveying fluid away from conduit 100. Inlet 114, outlet 116 and interior flow region 104 are in fluid communication. In the illustrated embodiment of FIGS. 1-3, conduit 100 comprises a flow-shaping element 125 comprising a flow-shaping channel 126 (defined by one or more flow-shaping surfaces 127) located between, and in fluid communication with both, inlet 114 and interior flow region 104, for conveying fluid therebetween. As discussed in more detail below, flow shaping channel 126 is shaped to control the velocity distribution of fluid flowing through interior flow region 104 of conduit 100.

As shown in FIG. 2, conduit body 102 and interior flow region 104 extend in a generally longitudinal direction 108 and a longitudinal channel axis 138 may be notionally defined that extends in longitudinal direction 108 through a transverse centroid of interior flow region 104. Longitudinal direction 108 may also be referred to herein as axial direction 108. In the illustrated embodiment, conduit body 102 is closed-ended. In the illustrated embodiment, an upstream end cap 140 is screwed onto (or otherwise coupled to) an upstream end 118 of conduit body 102 to close upstream end 118 of conduit body 102 and downstream end cap 142 is integrally formed with conduit body 102 (although such integral formation is not necessary). In other embodiments, upstream end 118 and downstream end 120 of conduit body 102 may be closed (e.g. with upstream and downstream end caps 140, 142 or otherwise) in any manner known in the art. In some embodiments, end caps 140, 142 may be transparent or translucent to at least some wavelengths of electromagnetic radiation.

In the illustrated embodiment of FIGS. 1-3, inlet 114 is oriented and/or shaped to direct fluid in an inlet flow direction 122 that is non-parallel to longitudinal direction 108, although this orientation is not necessary. In the illustrated embodiment of FIGS. 1-3, inlet flow direction 122 is in a generally transverse direction which is generally orthogonal to longitudinal direction 108, although this orientation is not necessary. In some embodiments, inlet flow direction 122 has at least a component that is orthogonal to longitudinal direction 108, although this orientation is not necessary. In general, inlet 114 may be oriented in any suitable direction for directing fluid into flow-shaping channel 126 (described in more detail below). In some embodiments, multiple inlets may be provided and each such inlet may be oriented and/or shaped to direct fluid into flow-shaping channel 126. In some such embodiments, each such inlet may be oriented in a corresponding inlet flow direction that is non-parallel to longitudinal direction 108, although such orientations are not necessary. In some such embodiments, each such inlet has a corresponding inlet flow direction that has at least a component that is orthogonal to longitudinal direction 108, although such orientations are not necessary.

Similarly, in the illustrated embodiment of FIGS. 1-3, outlet 116 is oriented and/or shaped to direct fluid from interior flow region 104 in an outlet flow direction 124 that is non-parallel to longitudinal direction 108, although this orientation is not necessary. In the illustrated embodiment of FIGS. 1-3, outlet flow direction 124 is in a generally transverse direction which is generally orthogonal to longitudinal direction 108, although this orientation is not necessary. In some embodiments, outlet flow direction 124 has at least a component that is orthogonal to longitudinal direction 108, although this orientation is not necessary. In general, outlet 116 may be oriented in any suitable direction for directing fluid out of interior flow region 104. In some embodiments, multiple outlets may be provided and each such outlet may be oriented and/or shaped to direct fluid from interior flow region 104 in a corresponding outlet flow direction that is non-parallel to longitudinal direction 108, although such orientations are not necessary. In some such embodiments, each such outlet has a corresponding outlet flow direction that has at least a component that is orthogonal to longitudinal direction 108, although such orientations are not necessary.

As best shown in FIG. 2, inlet 114 and outlet 116 of the illustrated embodiment are located on the opposite transverse sides of conduit body 102 (i.e. at the top and bottom of the illustrated FIG. 2 view) and the centers of their corresponding flow channels are generally co-planar (e.g. on the plane taken along line 2-2 shown in FIG. 1). In some embodiments, inlet 114 and outlet 116 may be located on the same transverse sides of conduit body 102 or on different, non-opposing, transverse sides of conduit body 102. In some embodiments, the centers of the flow channels of inlet 114 and outlet 116 need not be co-planar. In general, inlet 114 and outlet 116 may be located in any suitable positions and may have any suitable orientations as long as inlet 114 and outlet 116 are longitudinally spaced apart from one another with at least a portion of interior flow region 104 located longitudinally therebetween.

Conduit 100 comprises a flow-shaping element 125 comprising a flow-shaping channel 126 disposed between inlet 114 and interior flow region 104 to thereby communicate fluid from inlet 114 into interior flow region 104. Flow-shaping channel 126 is shaped (e.g. defined by flow shaping surface 127) to control the velocity distribution of fluid flowing through interior flow region 104 and, in particular, the transverse (i.e. orthogonal to longitudinal direction 108) components of the fluid velocity in interior flow region 104. In the illustrated embodiment, flow-shaping channel 126 is shaped (e.g. by suitable curvature) to impart arcuate (e.g. in a transverse circumferential direction) momentum and/or velocity onto the fluid flowing therethrough, such that this arcuate momentum and/or velocity is carried into interior flow region 104. In the particular case of the illustrated embodiment, flow-shaping channel 126 is shaped to impart two counter-rotating momenta and/or velocities onto the fluid flowing therethrough.

Figure 3A:
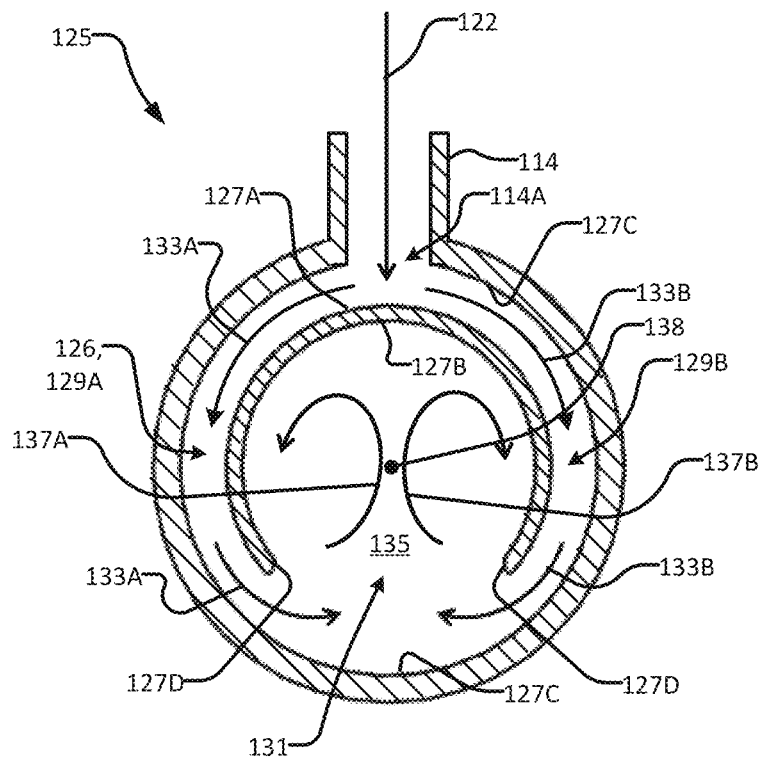
FIG. 3A shows a schematic cross-sectional view of the FIG. 1 fluid flow conduit, taken along line 3-3 shown in FIG. 1, schematically expanded in certain portions to more clearly illustrate fluid flow.
Figure 3B:
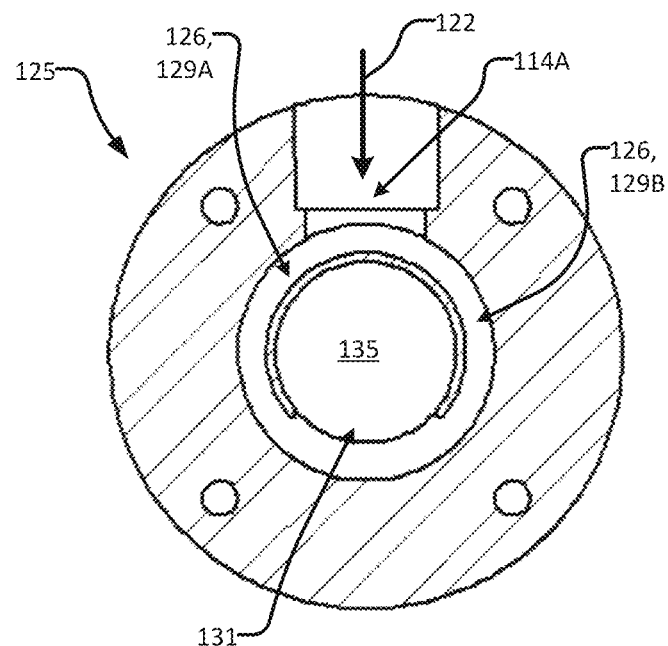
FIG. 3B is a more precise cross-sectional view of the FIG. 1 fluid flow conduit, taken along the line 3-3 shown in FIG. 1.

A particular embodiment of flow-shaping element 125 and flow-shaping channel 126 are shown in more detail in FIGS. 3A and 3B (collectively, FIG. 3). Flow-shaping channel 126 is defined by flow-shaping surfaces 127A, 127B, 127C, 127D (collectively, flow-shaping surface 127). As shown in FIG. 3, flow-shaping channel 126 comprises: a pair of opposing arcuate or curved channel portions 129A, 129B (collectively, arcuate or curved channel portions 129), defined by flow-shaping surfaces 127A, 127C; and a generally cylindrical bore portion 135, defined by flow-shaping surface 127B. Curved channel portions 129A, 129B are curved in first and second opposing angular directions about longitudinal axis 138 extending in longitudinal direction 108 (i.e. into and out of the page in the FIG. 3 view; see also longitudinal axis 138 in FIGS. 1, 2). These first and second opposing angular directions are shown in FIG. 3 by arrows 133A, 133B. Between arcuate channel portions 129 and cylindrical bore portion 135, flow-shaping channel 126 comprises a slit 131 defined by flow-shaping surfaces 127D (i.e. the edges between flow-shaping surfaces 127A, 127B. In the illustrated embodiment, slit 131 is located transversely opposite to the inlet aperture 114A of inlet 114, although this is not strictly necessary.

Figure 4A:
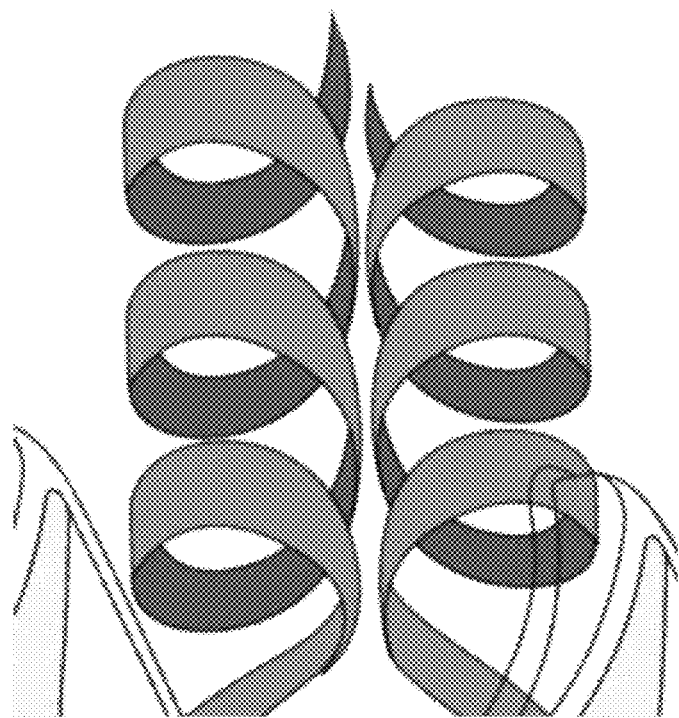
FIGS. 4A and 4B schematically depict the shape of the counter-rotating vortices generated in the portion of the conduit downstream of the FIG. 1 flow-restraining element.
Figure 4B:
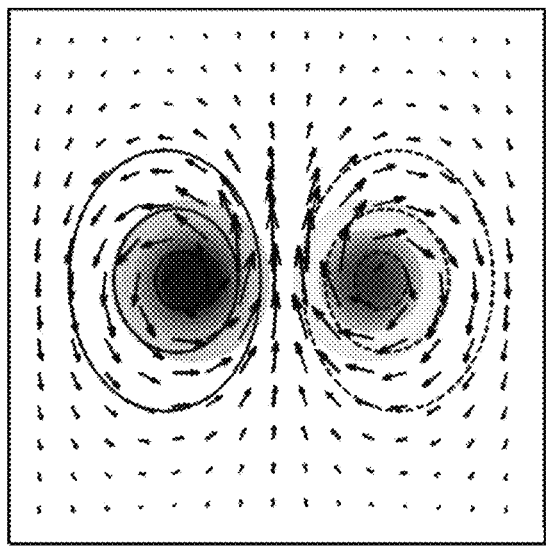

Fluid enters flow-shaping channel 126 from inlet aperture 114A of inlet 114. At this stage, in the illustrated embodiment of FIGS. 1-3, the average fluid flow is in direction 122. This fluid contacts arcuate-shaped (or curved) flow-shaping surface 127A and is directed along one of two arcuate (or curved) channels 129A, 129B (i.e. in opposing circumferential directions (opposing angular directions) about longitudinal axis 138) shown, in FIG. 3, by circumferential arrows 133A, 133B). Once fluid enters arcuate channels 129, its average fluid flow is converted to the opposing circumferential (angular) directions indicated by arrows 133A, 133B, imparting opposing angular momentum (about longitudinal axis 138) to the fluid in the two opposing arcuate channels 129A, 129B. Fluid continues travel through arcuate channels 129 until it reaches slit 131. At this stage, fluid travelling in arcuate channel 129A (in circumferential (angular) direction 133A) encounters fluid traveling in arcuate channel 129B (in circumferential (angular) direction 133B) and these two fluid flows push one another through slit 131 into cylindrical bore portion 135 of flow-shaping channel 126. In cylindrical bore portion 135, the fluid flow comprises a pair of counter-rotating vortices (indicated by arrows 137A, 137B), where the fluid from the opposing arcuate channels 129A, 129B continues to maintain at least some of its opposing angular momentum (about longitudinal direction 108) and opposing circumferential flow directions 137A, 137B. These counter-rotating vortices are shown schematically in FIGS. 4A and 4B. The inventors believe, without being bound by theory, in contrast with co-rotating vortices, counter-rotating vortices do not merge easily and do not dissipate quickly. Fluid flows from cylindrical bore portion 135 into interior flow region 104 of conduit 100 via aperture 139 (shown best in FIG. 2).

Fluid entering interior flow region 104 through aperture 139 maintains some of its opposing circumferential angular momentum (about the longitudinal direction) and/or opposing circumferential (angular) flow directions (i.e. in directions 137A, 137B shown in FIG. 3) and thereby exhibits desirable mixing and a desirably uniform residence time of the fluid flow in interior flow region 104 of conduit 100. Additionally, when flow-shaping element 125 is included in a UV photoreactor, the desirable mixing of the fluid within interior flow region 104 may permit the fluid to be exposed to a relatively uniform radiation dose.

In some embodiments, channels 129A, 129B need not be arcuate in the strict sense, provided that they are shaped to provide oppositely curved transverse fluid flow paths (e.g. curved about longitudinal axis 138 or longitudinal direction 108 in opposed angular directions) which impart opposing angular momentum (about longitudinal axis 138 and/or longitudinal direction 108) onto the portions of the fluid flow that travel down the respective channels 129. Similarly, cylindrical bore portion 135 need not be cylindrical in the strict sense, and may be shaped to provide a curved shaped bore portion with curved, but non-circular transverse cross-section. Channels 129A, 129B may each have a cross-sectional area (i.e. the area of the bore of channels 129A, 129B) that is less than the transverse cross-sectional area of cylindrical bore portion 135 and the transverse cross-sectional area of interior flow region 104. This change in cross-sectional area may cause fluid to enter cylindrical bore portion 135 with relatively high velocity/momentum. In some embodiments, a ratio of the transverse cross-sectional area of cylindrical bore portion 135 (and/or the transverse cross-sectional area of interior flow region 104) to the cross-sectional area of channels 129A, 129B is greater than 2.5. In some embodiments, this ratio is greater than 5. In some embodiments, this ratio is greater than 10.

In some embodiments, arcuate channels 129A, 129B are relatively large (in terms of their angular dimensions) compared to slit 131. For example, in some embodiments, when arcuate channels 129 and slit 131 are considered in transverse cross-section (i.e. in the view of FIG. 3), arcuate channels 129 extend over 270° of angular range about longitudinal axis 138 (leaving only 90° of angular range for slit 131). In some embodiments, arcuate channels 129 extend over 300° of angular range about longitudinal axis 138; in some embodiments, arcuate channels 129 extend over 330° of angular range about longitudinal axis 138; and in some embodiments, arcuate channels 129 extend over 350° of angular range about longitudinal axis 138.

An upstream end 143 of flow-shaping element is sealingly engaged with end cap 140. A suitable sealing ring (O-ring) may be located in groove 146. A downstream end 144 of flow-shaping element 125 may be mounted directly to conduit body 102. Flow-shaping element 125 may be sealingly coupled to conduit body 102 in any suitable manner known in the art. One or more sealing rings (O-rings) may be used to make such sealing coupling. In some embodiments, flow-shaping element 125 and conduit body 102 are integrally formed.

Fluid flow conduit 100 can be used as part of a reactor including, by way of non-limiting example, chemical reactors, bio-reactors, photoreactors (e.g. UV photoreactors) and/or the like, where uniform residence time in interior flow region 104 is generally desirable.

Figure 5:
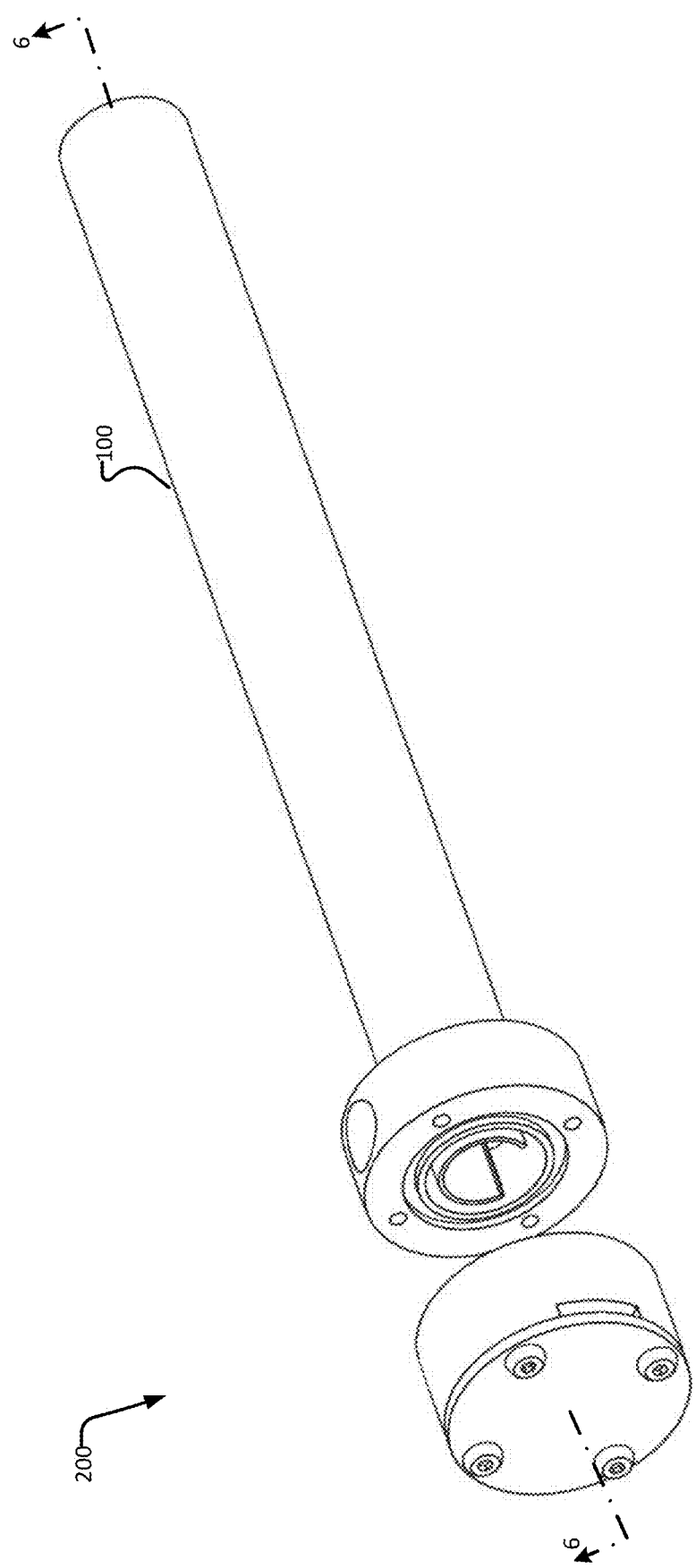
FIG. 5 shows a perspective view of a flow through UV photoreactor incorporating the FIG. 1 fluid flow conduit according to a particular embodiment.
Figure 6:
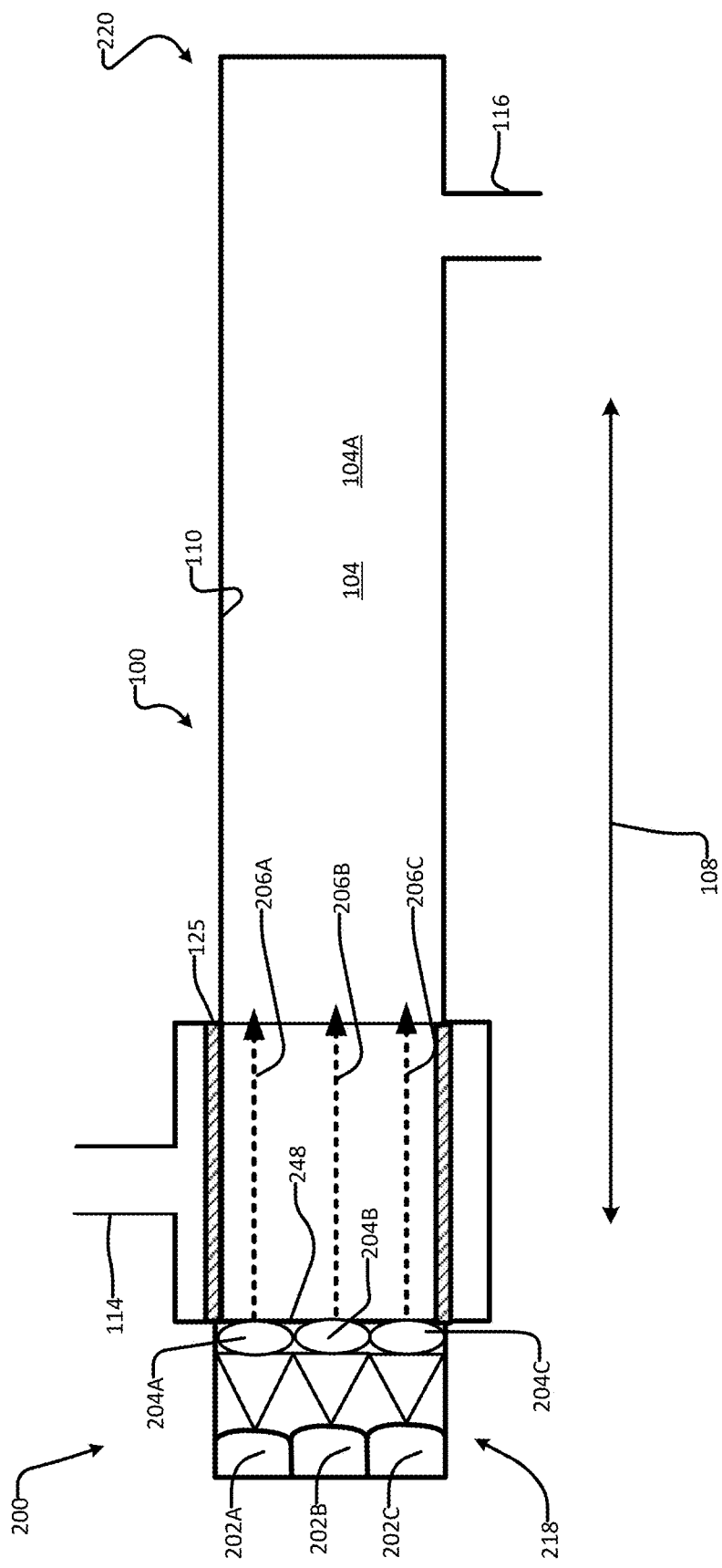
FIG. 6 shows a schematic cross-sectional view of the FIG. 5 UV photoreactor taken along the line 6-6 shown in FIG. 5.

For example, FIGS. 5 and 6 show a UV-LED based photoreactor 200 according to a particular embodiment comprising the fluid flow conduit 100 of FIGS. 1-3 with interior flow region 104 acting as the reaction chamber 104A for photoreactor 200. The efficacy of optical reactors such as photoreactor 200, is negatively impacted if fluids travel at non-uniform speeds through their reaction chambers, since this results in non-uniform residence time in the reaction chambers. In such photo reactors, fluids that travel at relatively low speeds may be exposed to sufficient electromagnetic radiation dose to be treated effectively. However, fluids that travel at relatively high speeds may not be exposed to sufficient electromagnetic radiation dose to be treated effectively, because of their correspondingly low residence time. Additionally, for most such photoreactors, the radiation fluence distribution is not generally uniform in their respective reaction chambers. Fluids that travel through regions of the reaction chamber having relatively high radiation fluence rate may be exposed to sufficient electromagnetic radiation dose to be treated effectively. However, fluids that travel through regions of relatively low radiation fluence rate may not be exposed to sufficient electromagnetic radiation dose to be treated effectively. Counter-rotating vortices 137A, 137B lead to the mixing of fluid in fluid flow conduit 100. This fluid mixing may in turn permit a relatively even dose distribution to the fluid flow through conduit 100, even in the case of non-uniform fluence rate distribution, since the fluid mixing enables the fluid to travel through regions of both high and low radiant fluence rate.

Figure 7:
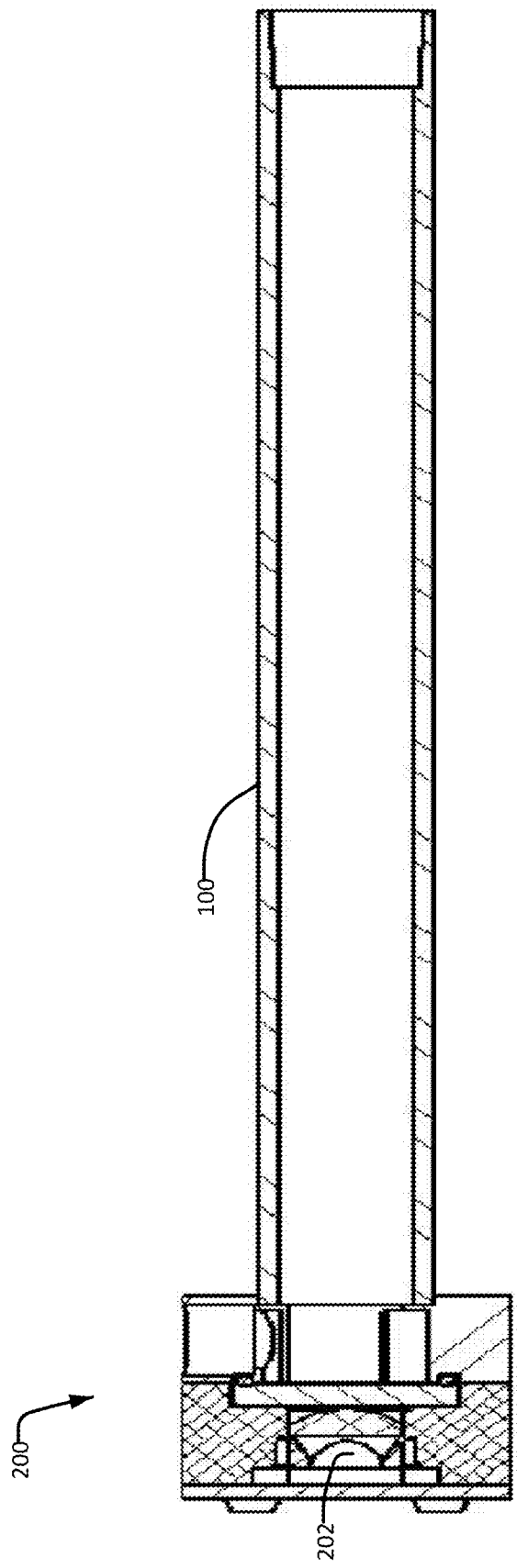
FIG. 7 shows a schematic cross-sectional view of a flow through UV photoreactor incorporating the FIG. 1 fluid flow conduit according to another example embodiment.

UV reactor 200 of the embodiments shown in FIGS. 5 and 6 comprises a plurality of UV electromagnetic radiation emitters 202A, 202B, 202C (collectively, UV emitters 202) positioned at an upstream longitudinal end 218 of reactor 200 to illuminate interior flow region 104, which serves as a reaction chamber 104A for UV reactor 200. UV reactor 200 need not comprise a plurality of UV emitters 202. In some embodiments, UV reactor 200 comprises one UV electromagnetic radiation emitter 202, as shown in the FIG. 7 embodiment. UV emitters may comprise directional UV emitters, such as UV-LEDs and their principal illumination axes 206A, 206B, 206C (collectively, principal illumination axes 206) may be generally oriented in the longitudinal direction 108, although this is not necessary. UV reactor 200 of the illustrated embodiment also comprises lenses 204A, 204B, 204C (collectively, lenses 204) for directing radiation from UV emitters 202 to reaction chamber 104A. In general, UV reactor 200 can include any suitable combination of optical elements (e.g. lenses, reflective surfaces and/or the like) for optically directing radiation from UV emitters to reaction chamber 104A. Because of the shape of flow-shaping element 125, radiation from UV emitters 202 is able to reach reaction chamber 104A without being unduly occluded by flow shaping element 125, thereby permitting some degree of fluence rate uniformity in reaction chamber 104A. It will be noted that generally speaking, the fluence rate in any photoreactor reaction chamber (including reaction chamber 104A of UV reactor 200) will be at least somewhat non-uniform. This non-uniformity of the fluence rate distribution makes it desirable to achieve good mixing of the fluid in the reaction chamber to achieve desired dose uniformity received by the fluid by movement of the fluid through regions of relatively high fluence rate and regions of relatively low fluence rate. In other embodiments, UV reactor 200 comprises a different number of UV emitters 202 at its upstream longitudinal end 218. In some embodiments, UV reactor 200 may additionally or alternatively be provided with one or more UV emitters 202 at its downstream longitudinal end 220. Electromagnetic radiation emitters 202 need not be UV emitters. In some embodiments, electromagnetic radiation emitters 202 may additionally or alternatively emit radiation having other wavelengths.

Flow-shaping element 125 of reactor 200 is the same as flow-shaping element 125 of fluid flow conduit 100 described above. Consequently, FIG. 3 and the discussion herein relating to FIG. 3 describe the characteristics of flow-shaping element 125 and the imparting of angular momentum (about the longitudinal direction) and generating a pair of counter-rotating vortices within the fluid flowing therethrough.

Due to these counter-rotating vortices in reaction chamber 104A and the corresponding mixing of fluid in reaction chamber 104A, the residence time in reaction chamber 104A may be relatively uniform (as compared to what this residence time would be without flow-shaping element 125). Also, as discussed above, the fluence rate uniformity in reaction chamber 104A may be somewhat uniform because flow-shaping element 125 does not unduly occlude radiation from UV emitters 202 from reaching reaction chamber 104A. Additionally, the fluid mixing may in turn permit a relatively even dose distribution to the fluid flow through conduit 100 even in the case of non-uniform fluence rate distribution, since the mixing fluid travels through regions of both high and low radiant fluence rate. It will be noted that generally speaking, the fluence rate in any photoreactor reaction chamber (including reaction chamber 104A of UV reactor 200) will be at least somewhat non-uniform. This non-uniformity of the fluence rate distribution makes it desirable to achieve good mixing of the fluid in the reaction chamber to achieve desired dose uniformity by the movement of the fluid through regions of relatively high fluence rate and regions of relatively low fluence rate. These two factors (relatively uniform residence time and relatively uniform fluence rate in reaction chamber 104A) lead to relatively uniform dose delivery to the fluid travelling through reactor 200 from inlet 114 to outlet 116. In this way, reactor 200 can be configured to ensure that the fluid travelling through reactor 200 receives sufficient dose. Flow-shaping element 125 may reduce the occurrence of short-circuiting where part of fluid passes through a UV reactor without receiving sufficient UV dose. Further, flow-shaping element 125 may advantageously make reactor 200 more efficient (relative to a reactor without flow-shaping element 125) due to the mixing within reaction chamber 104A caused by flow-shaping element 125.

As another example, FIG. 14 shows a UV-LED based photoreactor 700 according to a particular embodiment comprising the fluid flow conduit 100 of FIGS. 1-3 with interior flow region 104 acting as the reaction chamber 104A for photoreactor 700. Photoreactor 700 differs from photoreactor 200 in that the UV emitters 702A', 702B', 702C' (collectively, UV emitters 702') are located at downstream end 720 of reactor 700 as opposed to upstream end 718 and are oriented such that their respective principal optical axes 706A', 706B', 706C' (collectively, optical axes 706') are oriented to direct radiation through lenses 704A', 704B', 704C' (collectively, lenses 704') from downstream end 620 into reaction chamber 104A. In general, UV reactor 700 can include any suitable combination of optical elements (e.g. lenses, reflective surfaces and/or the like) for optically directing radiation from UV emitters to reaction chamber 104A.

It will be appreciated that the UV emitters 202 of reactor 200 and the UV emitters 702' of reactor 700 and their respective lenses 204, 704' (and/or other optical elements) may be combined into a single reactor which irradiates reaction chamber 104A from both the upstream and downstream directions.

Figure 8:
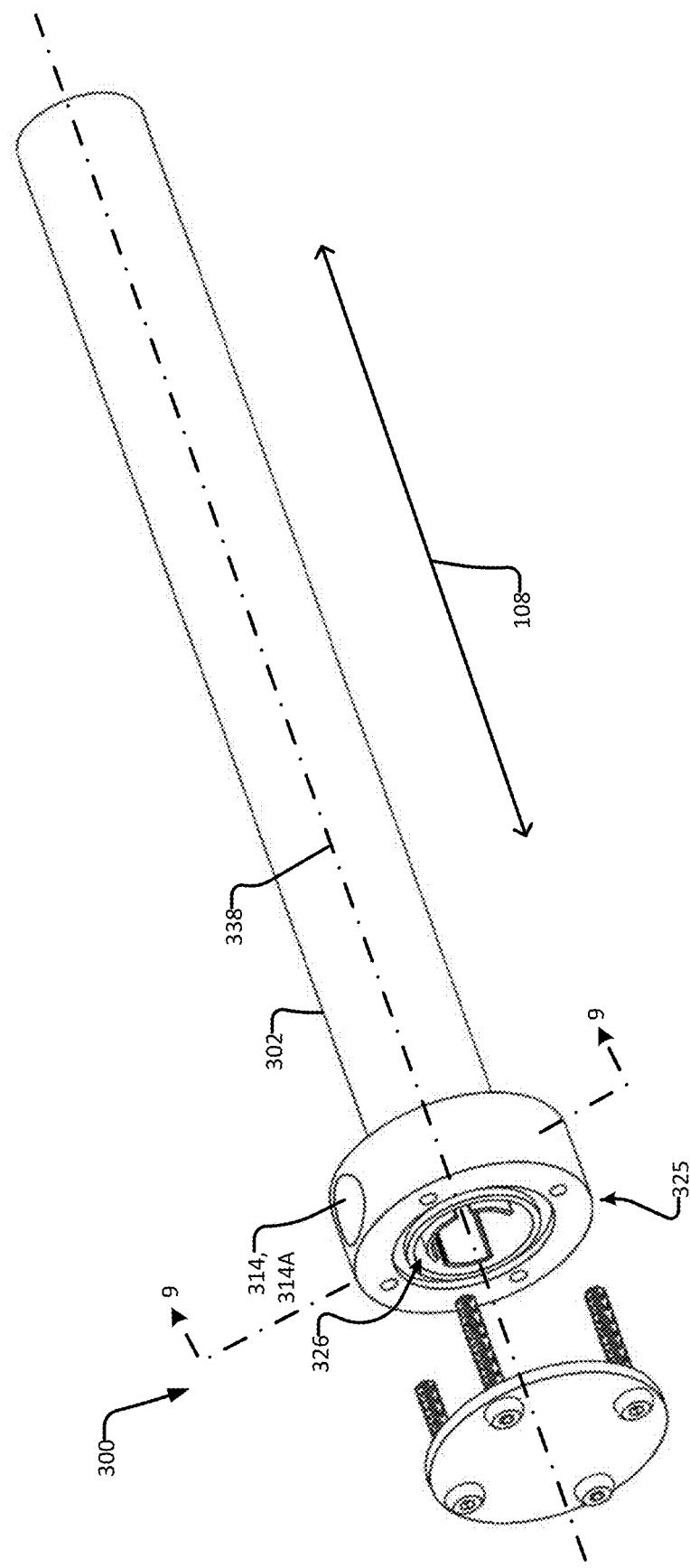
FIG. 8 shows a perspective view of a partially exploded perspective view of a fluid flow conduit incorporating a flow-restraining element according to another example embodiment.

FIGS. 8 and 9 show a fluid flow conduit 300 according to a second example embodiment. Elements of fluid flow conduit 300 that serve the same function and/or have the same characteristics as like elements of fluid flow conduit 100 are referred to using reference numerals incremented by 200, and specific details thereof are not described again, but are incorporated for fluid flow conduit 300 based on the description of fluid flow conduit 100 provided herein.

Fluid flow conduit 300 is similar to fluid flow conduit 100, except that fluid flow conduit 300 has a flow-shaping element 325 that has a flow-shaping conduit 326 and flow-shaping surfaces 327 that define a plurality of slits 331A, 331B, 331C (collectively, slits 331). Similar to flow-shaping element 125, flow-shaping element 325 is located between inlet 314 and interior flow region 304 and comprises a flow-shaping channel 326 (defined by one or more flow-shaping surfaces 326A) located between, and in fluid communication with both, inlet 314 and interior flow region 304 for conveying fluid therebetween. As discussed in more detail below, flow shaping channel 326 is shaped to control the velocity distribution of fluid flowing through interior flow region 304 of conduit 300.

Figure 9A:
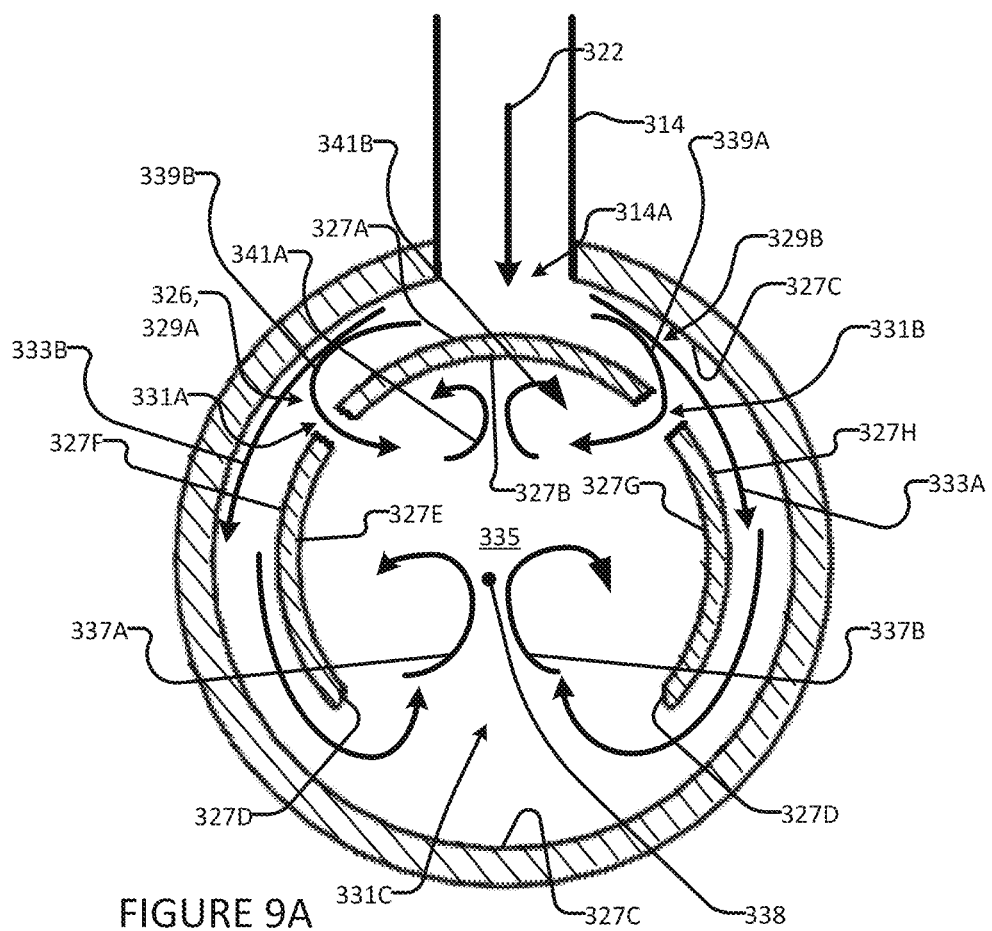
FIG. 9A shows a schematic cross-sectional view of the FIG. 8 fluid flow conduit taken along line 9-9 shown in FIG. 1, schematically expanded in certain portions to more clearly illustrate fluid flow.
Figure 9B:
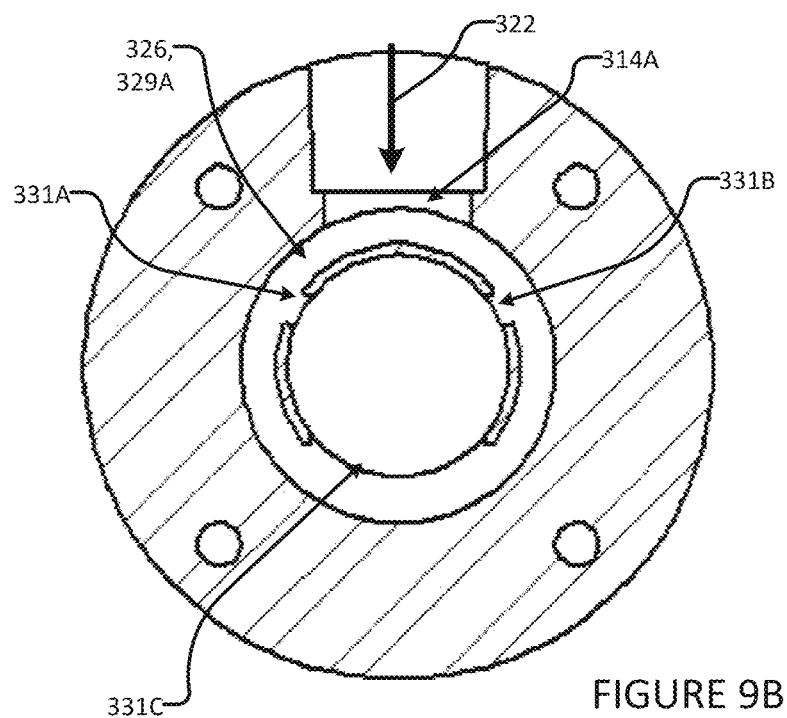
FIG. 9B is a more precise cross-sectional view of the FIG. 8 fluid flow conduit taken along line 9-9 shown in FIG. 8.

Flow-shaping channel 326 is defined by flow-shaping surfaces 327A, 327B, 327C, 327D, 327E, 327F, 327G, 327H (collectively, flow-shaping surface 327). As shown in FIGS. 9A and 9B (collectively, FIG. 9), flow-shaping channel 326 comprises: a pair of opposing arcuate (or curved) channel portions 329A, 329B (collectively, arcuate channel portions 329), defined by flow-shaping surfaces 327C and the combination of flow-shaping surfaces 327A, 327F and 327H; and a generally cylindrical bore portion 335, defined by flow-shaping surfaces 327B, 327E, 327G. Arcuate channel portions 329 extend in opposing first and second angular directions about longitudinal axis 138. These first and second opposing angular directions are shown in FIG. 9A by arrows 333A, 333B. Between arcuate channel portions 329 and cylindrical bore portion 335, flow-shaping channel 326 comprises a distal slit 331C and a pair of proximate slits 331A, 331B defined by the edges between flow-shaping surfaces 327A, 327B (edge surfaces 327D), the edges between flow-shaping surfaces 327E, 327F and the edges between flow-shaping surfaces 327G, 327H. In the illustrated embodiment, distal slit 331C is located transversely opposite to the inlet aperture 314A of inlet 314 and proximate slits 331A, 331B are respectively located in arcuate channel portions 329A, 329B at locations angularly closer to inlet aperture 314A.

Fluid enters flow-shaping channel 326 from inlet aperture 314A of inlet 314. At this stage, the average fluid flow is in direction 322. This fluid contacts arcuate-shaped (or curved) flow-shaping surface 327A and is directed along one of two arcuate channels 329A, 329B (i.e. in opposing circumferential (angular) directions about longitudinal axis 338 shown, in FIG. 9, by arrows 333A, 333B). Once fluid enters arcuate channels 329A, 329B, its average fluid flow is converted to the opposing circumferential (angular) directions about longitudinal axis 338 (or longitudinal direction 108) as indicated by arrows 333A, 333B, imparting opposing angular momentum (about the longitudinal direction) to the fluid in the two opposing arcuate channels 329A, 329B. Fluid continues travel through arcuate channels 329 until it reaches proximate slits 331A, 331B. At this stage, some of the fluid travelling in arcuate channel 329A passes through slit 331A into cylindrical bore portion 335 as shown by arrow 339A and some of the fluid travelling in arcuate channel 329B passes through slit 331 B into cylindrical bore portion 335 as shown by arrow 339B. When the fluid (shown by arrow 339A) travelling into bore portion 335 through slit 331A encounters the fluid (shown by arrow 339B) travelling into bore portion 335 through slit 331 B, these two fluid flows (which have been imparted with some angular momentum (about the longitudinal direction) after travelling through their respective arcuate channels 329A, 329B they form a pair of counter-rotating vortices (indicated by arrows 341A, 341 B), where the fluid from the opposing arcuate channels 329A, 329B continues to maintain at least some of its opposing angular momentum (about the longitudinal direction) and opposing circumferential flow directions 341A, 341B.

The remaining fluid continuing to flow through arcuate channels 329A, 329B (i.e. the fluid that does not pass through proximate slits 331A, 331B) behaves in the same manner as that described above for the fluid flowing through arcuate channels 129A, 129B of the FIG. 3 embodiment. When the fluid travelling in arcuate channel 329A (in circumferential direction 333A) encounters fluid traveling in arcuate channel 329B (in circumferential direction 333B), these two fluid flows push one another through distal slit 331C into cylindrical bore portion 335 of flow-shaping channel 326. In cylindrical bore portion 335, the fluid flow comprises a pair of counter-rotating vortices (indicated by arrows 337A, 337B), where the fluid from the opposing arcuate channels 329A, 329B continues to maintain at least some of its opposing angular momentum (about the longitudinal direction) and opposing circumferential flow directions 337A, 337B.

Fluid flows from cylindrical bore portion 335 into interior flow region 304 of conduit 300 via aperture 339.

Fluid entering interior flow region 304 through aperture 339 maintains some of its opposing circumferential angular momentum (about longitudinal axis 338 or longitudinal direction 108) and/or opposing circumferential flow (i.e. in directions 337A, 337B shown in FIG. 9) and thereby exhibits desirable mixing and a desirably uniform residence time of the fluid flow in interior flow region 304 of conduit 300. Additionally, a plurality of slits 331A, 331 B, 331C may permit more thorough mixing of the fluid, particularly in regions of interior flow region 304 proximate to flow-shaping element 325.

In some embodiments, channels 329 need not be arcuate in the strict sense, provided that they are shaped to provide oppositely curved transverse fluid flow paths (e.g. curved about longitudinal axis 338 or longitudinal direction 108) which impart opposing angular momentum (about the longitudinal direction) onto the portions of the fluid flow that travel down the respective channels 329. Similarly, cylindrical bore portion 335 need not be cylindrical in the strict sense, and may be shaped to provide a curved shaped bore portion with curved, but non-circular transverse cross-section. Channels 329A, 329B may each have a cross-sectional area (i.e. the area of the bore of channels 329A, 329B) that is less than the transverse cross-sectional area of cylindrical bore portion 335 and the transverse cross-sectional area of interior flow region 304. This change in cross-sectional area may cause fluid to enter cylindrical bore portion 335 with relatively high velocity/momentum. In some embodiments, a ratio of the transverse cross-sectional area of cylindrical bore portion 335 (and/or the transverse cross-sectional area of interior flow region 304) to the cross-sectional area of channels 329A, 329B is greater than 2.5. In some embodiments, this ratio is greater than 5. In some embodiments, this ratio is greater than 10.

In some embodiments, arcuate channels 329 are relatively large (in terms of their angular dimensions) compared to distal slit 331C. For example, in some embodiments, when arcuate channels 329 and distal slit 331C are considered in transverse cross-section (i.e. in the view of FIG. 9), arcuate channels 329 extend over 270° of angular range about longitudinal axis 338 (leaving only 90° of angular range for distal slit 331C). In some embodiments, arcuate channels 329 extend over 300° of angular range about longitudinal axis 338; in some embodiments, arcuate channels 329 extend over 330° of angular range about longitudinal axis 338; and in some embodiments, arcuate channels 329 extend over 350° of angular range about longitudinal axis 338. Distal slit 331C may have a transverse angular dimension that is greater than those of proximate slits 331A, 331 B, which may be desirable because the fluid in flow-shaping channel 326 may have a higher pressure near proximate slits 331A and 331 B and a lower pressure near distal slit 331C. The fluid in flow-shaping channel 326 may have a higher pressure near proximate slits 331A and 331 B, because proximate slits 331A and 331 B are located relatively closer to inlet 314 (as compared to distal slit 331C). In contrast, the fluid in flow-shaping channel 326 may have a lower pressure near distal slit 331C, because distal slit 331C is located further away from inlet 314, as compared to proximate slits 331A and 331 B. To have the fluid enter slits 331A, 331B and 331C with relatively uniform angular momentum, proximate slits 331A and 331 B each provide a smaller transverse angular dimension than distal slit 331C to account for the differences in fluid pressure and to thereby provide a more even fluid flow distribution among slits 331A, 331B, 331C.

Proximate slits 331A, 331 B may also have different transverse angular dimensions and different transverse angular locations. In some embodiments, the transverse angular dimensions of proximate slits 331A, 331 B are less than 15°; in some embodiments, these transverse angular dimensions are less than 10°. In some embodiments, the transverse angular locations of proximate slits 331A, 331 B are angularly spaced apart from the direction 322 of average fluid flow into flow-shaping channel 326 through inlet aperture 314A by at least 15°; in some embodiments, this angular spacing is at least 30°. In some embodiments, flow-shaping channel 326 may be provided with a different number (any suitable number) of proximate slits.

In other respects, flow-shaping element 325 and fluid flow conduit 300 may be similar to flow-shaping element 125 and fluid flow conduit 100 described herein.

Figure 10:
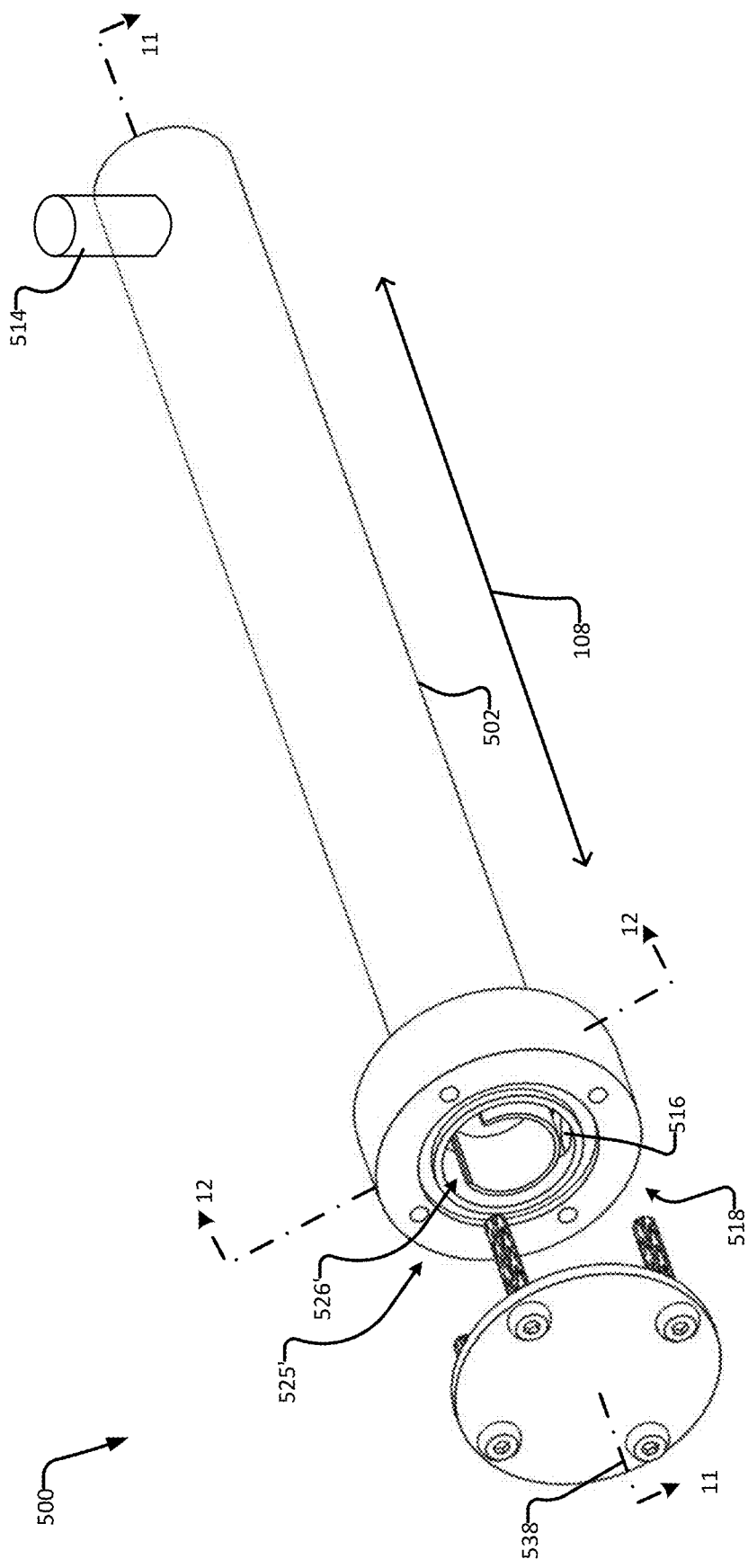
FIG. 10 shows a partially exploded perspective view of a fluid flow conduit according to another example embodiment.
Figure 11:
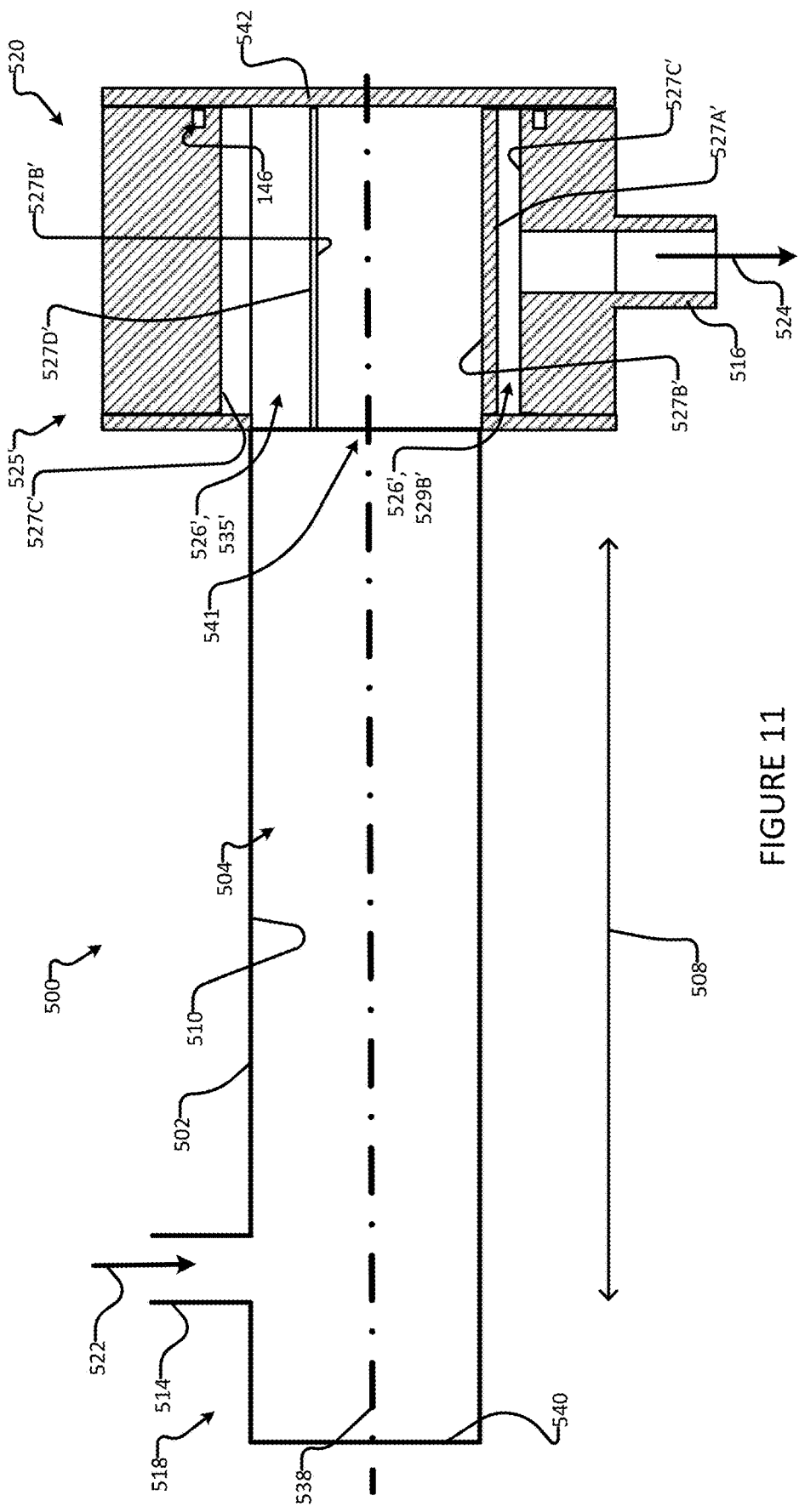
FIG. 11 shows a schematic cross-sectional view of the FIG. 10 fluid flow conduit, taken along line 11-11.
Figure 12:
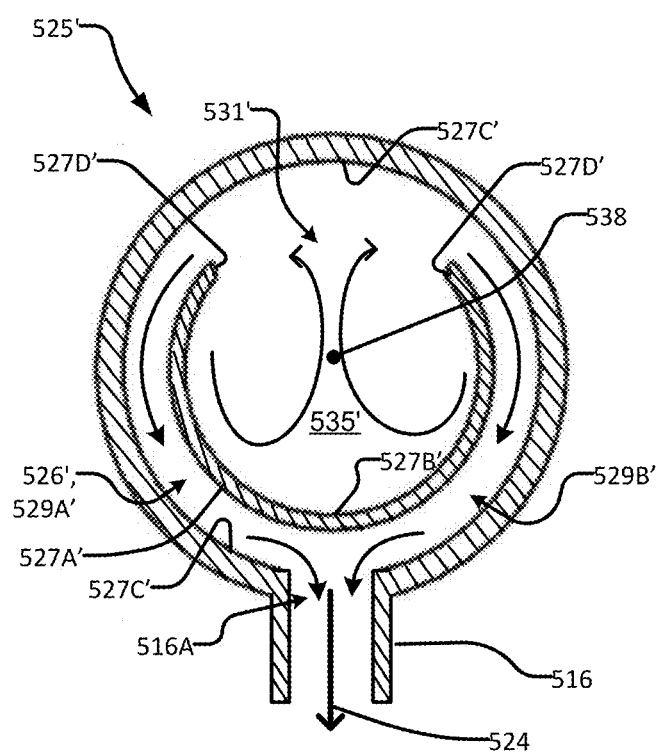
FIG. 12 shows a schematic cross-sectional view of the embodiment of FIG. 10, taken along line 12-12.

FIGS. 10-12 shows a fluid flow conduit 500 according to a third example embodiment. Elements of fluid flow conduit 500 that serve the same function as like elements of fluid flow conduit 100 are referred to using reference numerals incremented by 400, and specific details thereof are not described again but are incorporated for fluid flow conduit 500 based on the description of fluid flow conduit 100 provided herein.

Fluid flow conduit 500 is similar to fluid flow conduit 100, except that flow-shaping element 525' and its flow-shaping channel 526' channel (defined by one or more flow-shaping surfaces 527) is disposed at a downstream end 520 of conduit body 502 and is located between, and in fluid communication with, both, interior flow region 504 and outlet 516 for conveying fluid therebetween. The flow-shaping surfaces 527' of flow-shaping element 525' and the corresponding shape of flow-shaping channel 526' are substantially similar to those of slow-shaping element 125 described above. The components of flow-shaping element 525' are referenced using the prime symbol (') to indicate that they are at the downstream end 520 of conduit 500 for conducting fluid between interior flow region 504 and outlet 516. It should be noted that the perspective view of FIG. 10 is shown from the outlet end 520 of fluid flow conduit to show detail of flow-shaping element 525'.

The primary difference between flow-shaping element 525' and flow-shaping element 125 described above is the direction of fluid flow therethrough. In contrast to flow-shaping element 125 which conveys fluid through flow-shaping conduit 126 from inlet 114 to interior flow region 104 of conduit 100, flow-shaping element 525' conveys fluid through flow-shaping conduit 526' from interior flow region 504 of conduit 500 to outlet 516. More specifically, fluid flows from interior flow region 504 into cylindrical bore portion 535' through aperture 541 (see FIG. 11). The angular momentum imparted on the fluid by flow-shaping channel 526' causes the fluid to exhibit counter-rotating vortices in the central bore portion 535'. This is because the fluid exiting from flow-shaping channel 526' in two opposed angular directions (about axis 538) which are opposite of each other, which causes flow separation of the flow prior to reaching slit 516A, and the formation of vortices prior to the separation. In other words, and better shown in FIG. 12, when the fluid exits from cylindrical bore portion 535' and flows into flow-shaping channel 526', flow separation occurs with one portion flowing in a first angular direction about axis 538 and another portion flowing in a second angular direction about axis 538 opposed to the first angular direction. The first and second opposed angular directions about axis 538 result in an angular momentum that may cause the fluid in 535' central bore to exhibit counter-rotating vortices.

In some embodiments, channels 529' need not be arcuate in the strict sense, provided that they are shaped (e.g. curved about a longitudinal direction) to provide oppositely curved transverse fluid flow paths which impart opposing angular momentum (about longitudinal axis 538 or longitudinal direction 108) onto the portions of the fluid flow that travel down the respective channels 529'. Similarly, cylindrical bore portion 535' need not be cylindrical in the strict sense, and may be shaped to provide a curved shaped bore portion with curved, but non-circular transverse cross-section. Channels 529' may each have a cross-sectional area (i.e. the area of the bore of channels 529') that is less than the transverse cross-sectional area of cylindrical bore portion 535' and the transverse cross-sectional area of interior flow region 504. This change in cross-sectional area may impart angular momentum on the fluid in cylindrical bore portion 535', as the velocity/momentum of the fluid increases as it enters channels 529'. In some embodiments, a ratio of the transverse cross-sectional area of cylindrical bore portion 535' (and/or the transverse cross-sectional area of interior flow region 504) to the cross-sectional area of channels 529' is greater than 2.5. In some embodiments, this ratio is greater than 5. In some embodiments, this ratio is greater than 10.

In some embodiments, arcuate channels 529' are relatively large (in terms of their angular dimensions) compared to slit 531'. For example, in some embodiments, when arcuate channels 529' and slit 531' are considered in transverse cross-section (i.e. in the view of FIG. 12), arcuate channels 529' extend over 270° of angular range about longitudinal axis 538 (leaving only 90° of angular range for slit 531'). In some embodiments, arcuate channels 529' extend over 300° of angular range about longitudinal axis 538; in some embodiments, arcuate channels 529' extend over 330° of angular range about longitudinal axis 538; and in some embodiments, arcuate channels 529' extend over 350° of angular range about longitudinal axis 538.

Figure 13:
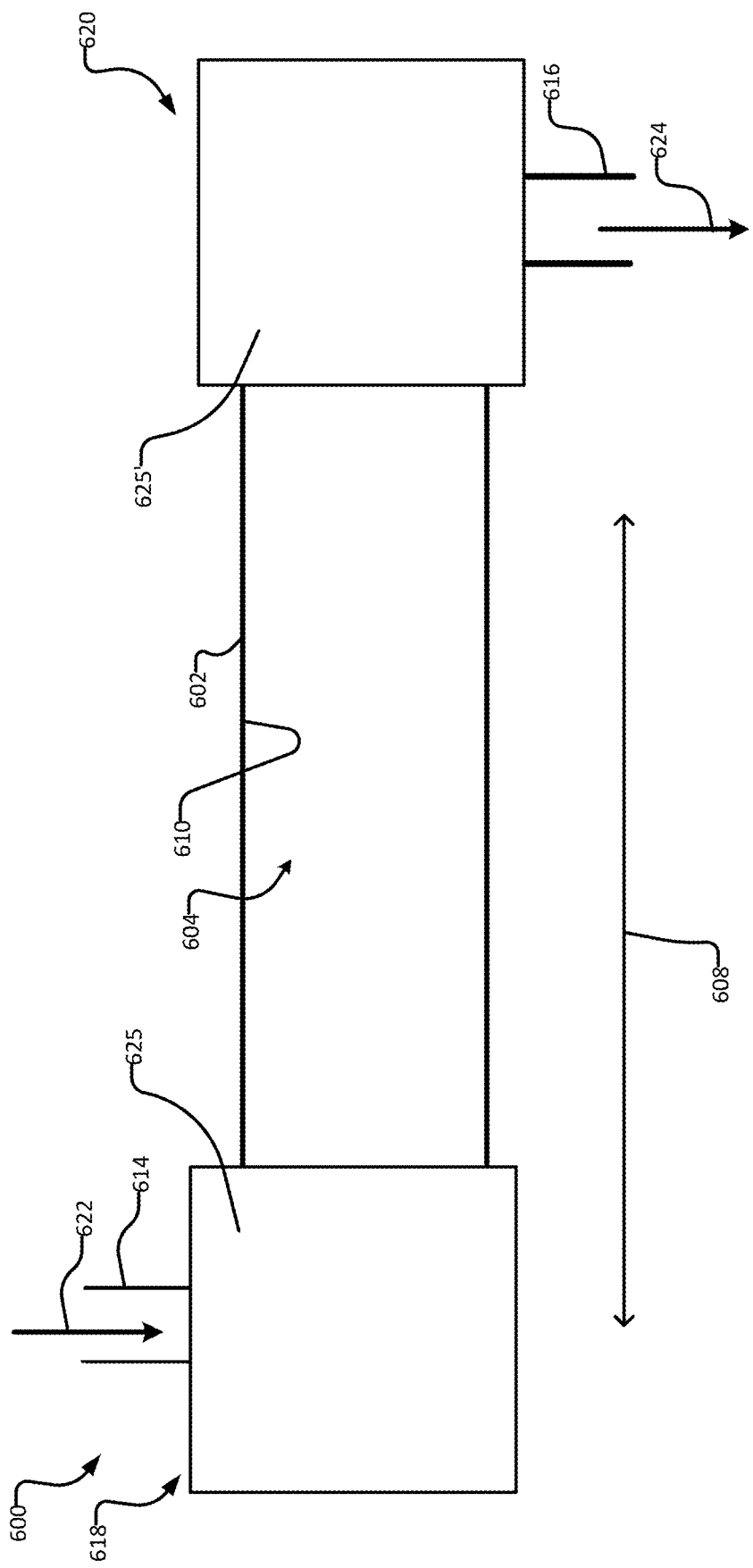
FIG. 13 shows a schematic cross-sectional view of a fluid flow conduit according to another example embodiment.

FIG. 13 shows a fluid flow conduit 600 according to a fourth example embodiment. Elements of fluid flow conduit 600 that serve the same function as like elements of fluid flow conduit 100 are referred to using reference numerals incremented by 500, and specific details thereof are not described again but are incorporated for fluid flow conduit 600 based on the description of fluid flow conduit 100 provided herein.

Fluid flow conduit 600 is similar to a combination of fluid flow conduit 100 and fluid flow conduit 500 described above. Specifically, like fluid flow conduit 100, fluid flow conduit 600 comprises a flow-shaping element 625 (substantially identical to flow-shaping element 125) at its upstream end 618 and, like fluid flow conduit 500, fluid flow conduit 600 comprises a flow-shaping element 625' (substantially identical to flow-shaping element 525') at its downstream end 620.

The operation of fluid flow conduit 600 at its upstream end 618 (i.e. conducting fluid from inlet 614 to interior flow region 604 through flow-shaping element 625) is substantially similar to that of fluid flow conduit 100 (and its flow-shaping element 125) described above. The operation of fluid flow conduit 600 at its downstream end 620 (i.e. conducting fluid from interior flow region 604 to outlet 616 through flow-shaping element 625') is substantially similar to that of fluid flow conduit 500 (and its flow-shaping element 525') described above.

While a number of exemplary aspects and embodiments have been discussed above, those of skill in the art will recognize certain modifications, permutations, additions and sub-combinations thereof. For example:

Reactors 200, 700 are described herein based on fluid flow conduit 100 of the embodiment shown in FIGS. 1-3. Reactors 200, 700 could be provided with any of the other fluid flow conduits described herein.

Fluid flow conduits 500 (FIGS. 10-12) and 600 (FIG. 13) are described herein using respective "single-slit" flow-shaping elements 525', 625, 625' that have the same shape as the "single-slit" flow-shaping element 125 of fluid flow conduit 100 (FIGS. 1-3). Fluid flow conduits 500 and 600 could additionally or alternatively be provided with "multiple-slit" flow-shaping elements analogous to "multiple-slit" flow-shaping element 325 (FIGS. 8 and 9).

The various flow-shaping passages of the various embodiments are described herein as comprising slits. Such slits may be made of or covered with a mesh or porous material. A mesh or porous material may comprise a material having a volume wherein a percentage of such volume comprises fluid flow channels or voids. In some embodiments, this volume percentage of fluid flow channels or voids is greater than 25%. In some embodiments, this volume percentage is greater than 50% or, in some embodiments, greater than 75%. The mesh material used to make or disposed over different slits may have different porosity.

The flow-shaping channel can have any suitable configurations as long as the flow-shaping channel is shaped to provide a first curved channel portion that is curved about a longitudinal axis in a first angular direction to impart angular momentum about the longitudinal axis in the first angular direction on fluid flow through the first curved channel portion. In some embodiments, the curvature of the flow-shaping channel can be shaped to have a shape similar to part of a circle, ellipse or parabola. It is therefore intended that the following appended claims and claims hereafter introduced are interpreted to include all such modifications, permutations, additions and sub-combinations as are consistent with the broadest interpretation of the specification as a whole.

The invention claimed is:

1. A fluid flow conduit comprising:
a conduit body shaped to define a longitudinally oriented interior flow region;
an inlet for introducing fluid into the interior flow region;
an outlet for conveying fluid out of the interior flow region; and
a flow-shaping element located in a fluid flow path between the inlet and the outlet, the flow-shaping element comprising a flow-shaping channel shaped to provide a first curved channel portion that is curved about a longitudinal axis in a first angular direction;
wherein the first curved channel portion is shaped to impart angular momentum about the longitudinal axis in the first angular direction on fluid flow through the first curved channel portion;
wherein the flow-shaping channel is shaped to provide a second curved channel portion that is curved about the longitudinal axis in a second angular direction, the second angular direction opposed to the first angular direction, wherein the second curved channel is shaped to impart angular momentum about the longitudinal axis in the second angular direction on fluid flow through the second curved channel portion;
wherein the flow-shaping channel is shaped to provide an opening that communicates fluid between the first and second curved channel portions and a bore portion.

2. A conduit according to claim 1, wherein the flow-shaping element is located between the inlet and the interior flow region and the opening is located transversely opposite to the inlet.

3. A conduit according to claim 1, wherein the flow-shaping element is located between the interior flow region and the outlet and the opening is located transversely opposite to the outlet.

4. A conduit according to claim 1, wherein the flow-shaping channel is shaped to provide one or more second openings that communicate fluid between at least one of the first and second curved channel portions and the bore portion.

5. A conduit according to claim 1, wherein the bore portion is located relatively more proximate, in a transverse direction, than the first and second curved channel portions to the longitudinal axis about which the first and second curved channel portions are curved.

6. A conduit according to claim 1, wherein the flow-shaping element is located in the fluid flow path between: the inlet and the interior flow region for directing fluid from the inlet, through the flow-shaping channel and into the interior flow region.

7. A conduit according to claim 1, wherein the fluid flowing through the interior flow region has an average flow rate that is slower than an average flow rate of the fluid flowing through the first and second curved channel portions.

8. A flow-through reactor for fluid, the flow-through reactor comprising:
a fluid flow conduit comprising a conduit body shaped to define a longitudinally oriented interior flow region which provides a reaction chamber for the flow-through reactor;
an inlet for introducing fluid into the interior flow region;
an outlet for conveying fluid out of the interior flow region; and
a flow-shaping element located in a fluid flow path between the inlet and the outlet, the flow-shaping element comprising a flow-shaping channel shaped to provide a first curved channel portion that is curved about a longitudinal axis in a first angular direction;
wherein the first curved channel portion is shaped to impart angular momentum about the longitudinal axis in the first angular direction on fluid flow through the first curved channel portion; and
wherein the flow-shaping channel is shaped to provide a second curved channel portion that is curved about the longitudinal axis in a second angular direction, the second angular direction opposed to the first angular direction, wherein the second curved channel portion is shaped to impart angular momentum about the longitudinal axis in the second angular direction on fluid flow through the second curved channel portion.

9. A fluid flow conduit according to claim 8 wherein the conduit forms part of a flow-through UV photoreactor, wherein the interior flow region of the conduit provides a reaction chamber of the flow-through reactor.

10. A conduit according to claim 8, wherein the inlet is oriented in an inlet flow direction that is non-parallel to the longitudinal axis.

11. A conduit according to claim 8, wherein the outlet is oriented in an outlet flow direction that is non-parallel to the longitudinal axis.

12. A conduit according to claim 8, wherein the flow-shaping channel is shaped such that an average flow direction of the fluid is in the longitudinal direction when the fluid enters the interior flow region.

13. A conduit according to claim 8, wherein the flow-shaping channel is shaped such that the fluid entering the interior flow region has local angular momentum that causes the fluid entering the interior flow region to exhibit counter-rotating vortices.

14. A conduit according to claim 8, wherein the inlet is shaped and/or oriented such that an average flow direction of the fluid is non-parallel to the longitudinal direction when the fluid enters the flow-shaping channel.

15. A conduit according to claim 8, wherein the flow-shaping element is shaped so as to permit radiation to impinge on fluid in the reaction chamber without occlusion from the flow-shaping element.

16. A method for controlling a velocity distribution of fluid flowing through a fluid flow conduit, the method comprising:
introducing fluid via an inlet into a longitudinally oriented interior flow region of the fluid flow conduit;
flowing the fluid through the interior flow region;
flowing the fluid through a flow-shaping element located in a fluid flow path between the inlet and the outlet, the flow-shaping element comprising a flow-shaping channel providing a first curved channel portion that is curved about a longitudinal axis in a first angular direction to thereby impart angular momentum about the longitudinal axis in the first angular direction on fluid flow through the first curved channel portion;

conveying the fluid out of the interior flow region via an outlet; and flowing the fluid through a second curved channel portion that is curved about the longitudinal axis in a second angular direction, the second angular direction opposed to the first angular direction to thereby impart angular momentum about the longitudinal axis in the second angular direction on fluid flow through the second curved channel portion.

17. A method according to claim 16 or any other claim herein, comprising: flowing the fluid through an opening that communicates fluid between the first and second curved channel portions and a bore portion; and flowing the fluid from the first and second curved channel portions into the bore portion.

18. A method according to claim 17, wherein the fluid flowing through the bore portion exhibits counter-rotating vortices.

* * * * *